US008051387B2

(12) United States Patent
Tuli et al.

(10) Patent No.: US 8,051,387 B2
(45) Date of Patent: Nov. 1, 2011

(54) METHOD, COMPUTER PROGRAM PRODUCT AND APPARATUS PROVIDING AN IMPROVED SPATIAL USER INTERFACE FOR CONTENT PROVIDERS

(75) Inventors: Apaar Tuli, Helsinki (FI); Saket Gupta, Helsinki (FI); Marcel Keppels, Masala (FI)

(73) Assignee: Nokia Corporation, Espoo (FI)

( * ) Notice: Subject to any disclaimer, the term of this patent is extended or adjusted under 35 U.S.C. 154(b) by 825 days.

(21) Appl. No.: 11/824,256

(22) Filed: Jun. 28, 2007

(65) Prior Publication Data

US 2009/0006993 A1 Jan. 1, 2009

(51) Int. Cl.
*G06F 3/048* (2006.01)
(52) U.S. Cl. .......................... 715/835; 715/815
(58) Field of Classification Search .................. 715/835
See application file for complete search history.

(56) References Cited

U.S. PATENT DOCUMENTS

| | | | | |
|---|---|---|---|---|
| 6,300,967 | B1 * | 10/2001 | Wagner et al. | 715/784 |
| 7,313,766 | B2 * | 12/2007 | Kautto Kiovula et al. | 715/853 |
| 7,941,764 | B2 * | 5/2011 | Svendsen et al. | 715/833 |
| 2001/0030667 | A1 * | 10/2001 | Kelts | 345/854 |
| 2002/0054134 | A1 * | 5/2002 | Kelts | 345/788 |
| 2003/0191753 | A1 | 10/2003 | Hoch | 707/3 |
| 2004/0070593 | A1 | 4/2004 | Neely et al. | 345/716 |
| 2006/0004914 | A1 * | 1/2006 | Kelly et al. | 709/219 |
| 2008/0010615 | A1 * | 1/2008 | Curtis et al. | 715/846 |
| 2008/0092054 | A1 * | 4/2008 | Bhumkar et al. | 715/739 |
| 2008/0104521 | A1 * | 5/2008 | Dubinko et al. | 715/744 |
| 2008/0114764 | A1 * | 5/2008 | Choi | 707/7 |
| 2008/0168390 | A1 * | 7/2008 | Benyamin | 715/810 |
| 2008/0222105 | A1 * | 9/2008 | Matheny | 707/3 |
| 2008/0250312 | A1 * | 10/2008 | Curtis | 715/700 |
| 2008/0282186 | A1 * | 11/2008 | Basavaraju | 715/781 |

FOREIGN PATENT DOCUMENTS

EP 1 538 838 A1 6/2005

OTHER PUBLICATIONS liveplasma, http://www.liveplasma.com/.
musicmap, http://www.dimvision.com/.
MusicIP, http://www.musicip.com/.
Pandora, http://www.pandora.com/.
The Music Genome Project, http://www.pandora/com/mgp.shtml.

* cited by examiner

*Primary Examiner* — Ashraf Zahr
(74) *Attorney, Agent, or Firm* — Harrington & Smith

(57) ABSTRACT

Methods, computer program products and apparatus provide an improved spatial user interface for content providers. In one non-limiting, exemplary embodiment, a method includes: displaying a plurality of first user interface (UI) objects each corresponding to an individual category of a plurality of categories, wherein a distance between two displayed first UI objects is indicative of a degree of similarity between the corresponding categories; and in response to a user selection of one of the displayed first UI objects, displaying at least one second UI object identifying at least one content provider associated with the category of the selected first UI object. The exemplary method may be utilized, for example, to assist a user in locating radio stations similar to a preferred radio station.

34 Claims, 15 Drawing Sheets

METHOD, COMPUTER PROGRAM PRODUCT AND APPARATUS PROVIDING AN IMPROVED SPATIAL USER INTERFACE FOR CONTENT PROVIDERS

TECHNICAL FIELD

The exemplary embodiments of this invention relate generally to a user interface and, more specifically, relate to an interactive display of radio stations.

BACKGROUND

A radio station is a broadcasting service wherein audio (sound) modulates, in some manner, a radio frequency (RF) carrier. Although traditionally broadcast through the air as radio waves from a transmitter to an antenna of a receiving device, radio stations can also broadcast via cable FM, local networks, satellite and the Internet.

Internet radio enables a user to listen to audio content broadcast from around the globe. It is a rapidly growing broadcast medium, with new internet radio channels (stations) being added every day. With the growth of broadband connections, setting up a radio station and broadcasting over the internet (e.g., from home) using commonly-available software and/or hardware has become a reality.

SUMMARY

In an exemplary aspect of the invention, a method includes: displaying a plurality of first user interface (UI) objects each corresponding to an individual category of a plurality of categories, wherein a distance between two displayed first UI objects is indicative of a degree of similarity between the corresponding categories; and in response to a user selection of one of the displayed first UI objects, displaying at least one second UI object identifying at least one content provider associated with the category of the selected first UI object.

In another exemplary aspect of the invention, a computer program product includes program instructions embodied on a tangible computer-readable medium. Execution of the program instructions results in operations including: displaying a plurality of first user interface (UI) objects each corresponding to an individual category of a plurality of categories, wherein a distance between two displayed first UI objects is indicative of a degree of similarity between the corresponding categories; and in response to a user selection of one of the displayed first UI objects, displaying at least one second UI object identifying at least one content provider associated with the category of the selected first UI object.

In a further exemplary aspect of the invention, an electronic device includes: a display device configured to display a plurality of first user interface (UI) objects each corresponding to an individual category of a plurality of categories, wherein a distance between two displayed first UI objects is indicative of a degree of similarity between the corresponding categories; and a user input, wherein in response to a user utilizing the user input to select one of the displayed first UI objects, the display device is configured to display at least one second UI object identifying at least one content provider associated with the category of the selected first UI object.

In another exemplary aspect of the invention, an electronic device includes: display means for displaying a plurality of first user interface (UI) objects each corresponding to an individual category of a plurality of categories, wherein a distance between two displayed first UI objects is indicative of a degree of similarity between the corresponding categories; and user input means for receiving a user input, wherein in response to a user utilizing the user input means to select one of the displayed first UI objects, the display, means is further configured for displaying at least one second UI object identifying at least one content provider associated with the category of the selected first UI object.

BRIEF DESCRIPTION OF THE DRAWINGS

The foregoing and other aspects of exemplary embodiments of this invention are made more evident in the following Detailed Description, when read in conjunction with the attached Drawing Figures, wherein.

DETAILED DESCRIPTION

While there are numerous internet radio stations available, it may be difficult to discover stations that a user prefers by simply looking at descriptions. Such descriptions generally do not provide users with a good idea of the kind of music the station plays. Using conventional systems and techniques, to discover new stations, a user may have to tune to them and listen for a period of time in order to determine whether the user likes the new station (e.g., to develop an understanding of the music being played, to get a sense or feel for the radio station).

Conventional radio station user interfaces (UIs, or UI in the singular) are often list-based, arranging a list of music stations alphabetically or based on popularity. Such list-based UIs do not offer a user information such as which radio stations play similar music. That is, list-based radio station UIs do not aid in music discovery (e.g., discovering new radio stations that a user would like) because the lists are largely ineffective in showing the degree of closeness (e.g., similarity) between radio stations.

Users may be more likely to discover new music if they are able to compare their own music tastes with those of other users. Thus, if a user is able to see which other radio stations are listened to by listeners of a selected, preferred radio station, there is a higher likelihood of finding similar music stations that the user likes.

There also exist various systems and tools that assist a user in locating new artists or songs based on the user's musical preferences (e.g., musical artists the user likes, musical genres the user likes). For example, MusicIP, when given a song, shows ten other, similar songs the user might like. As another example, given a preferred artist or song, Pandora®, utilizing The Music Genome Project, recommends other artists and songs to a user, for example, by generating a "radio station" of similar songs. The user can also see other users who like the same song or artist and other songs or artists the other users like.

Some e-commerce sites (e.g., Amazon®)) and programs (iTunes®) provide recommendations to users of albums, songs and/or artists similar to the preferred album, song or artist. These similarity results may be based on the prior purchase behavior of a large set of users. Subsequent users can use the similarity results as a guide to judging their interest in a particular genre or theme.

Figure 1:
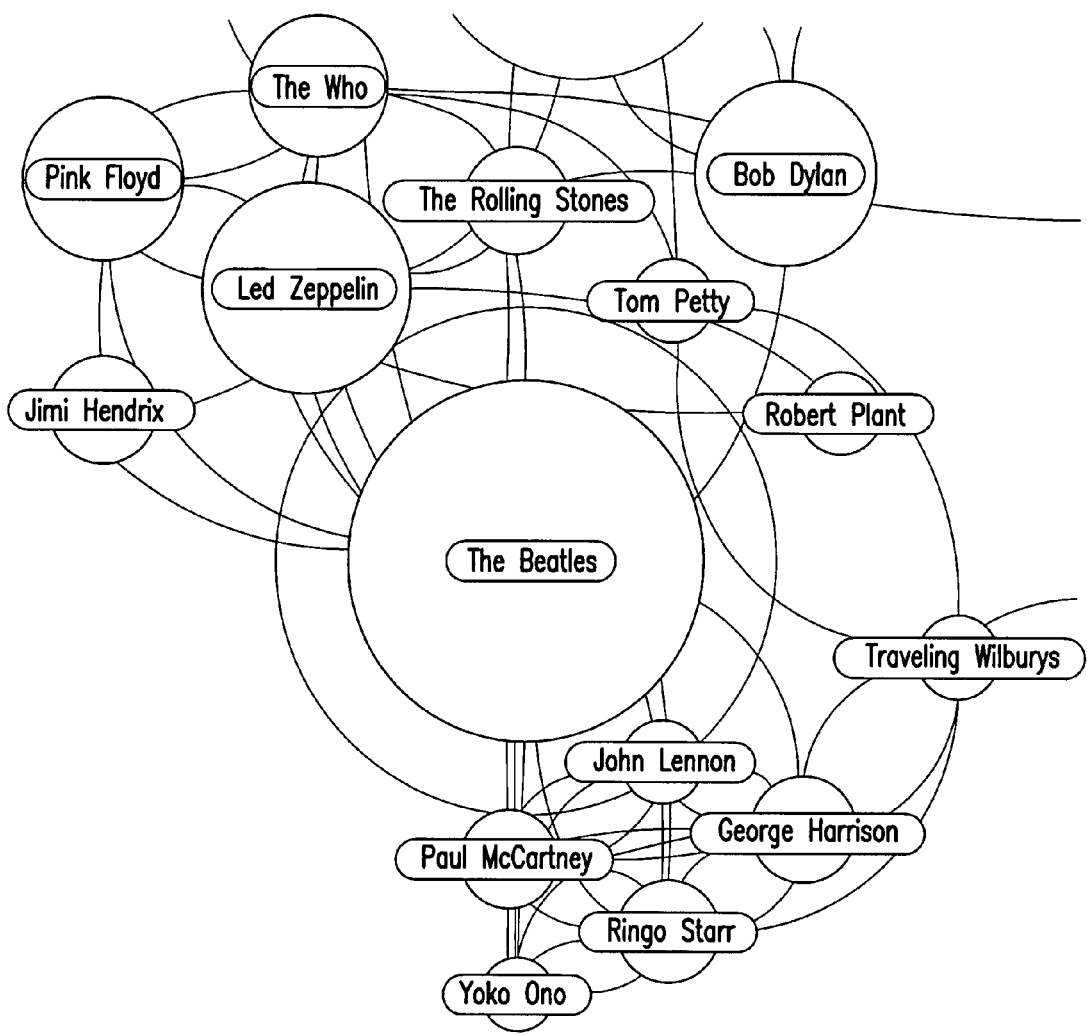
FIG. 1 shows a portion of the Liveplasma results for The Beatles.

To aid in discovering new musical artists that a user might enjoy, at least one conventional system utilizes spatial metaphors to illustrate relationships between different musical artists. For example, Liveplasma shows connections between similar artists, as well as relative popularity among the artists shown (by correlating size with relative popularity). FIG. 1 shows a portion of the Liveplasma results for The Beatles. As another example, Musicmap is an application for exploring album relationships based on Amazon®'s similarity results.

While there exist techniques, websites and programs for discovering new music based on preexisting music preferences, there are no such techniques, websites or programs for assisting with the discovery of new radio stations based on, for example, preexisting music preferences or preexisting radio station preferences. Thus, it would be desirable to provide techniques and tools to assist in discovering new radio stations. It would also be desirable, utilizing the same or similar techniques, to provide techniques and tools to assist in discovering new content providers that are similar to another, preferred content provider.

The exemplary embodiments of the invention assist a user, for example, in discovering new radio stations by providing a visual association (e.g., an arrangement, a UI) that enables a user to easily locate and select similar radio stations. As a non-limiting example, and as further described below, the visual association may be based on musical genres (e.g., by associating the radio stations with musical genres). Note that in other exemplary embodiments, the exemplary embodiments of the invention may assist a user in discovering other items, such as other content providers, for example.

In one, non-limiting exemplary embodiment, two maps, a genre map and a station map, comprise the basis for two UIs, a genre UI and a station UI, respectively. Each of these maps, together with the associated UI, will be discussed separately below. While the below-described exemplary embodiment utilizes both of the maps and associated UIs, other exemplary embodiments may comprise only one of the maps with its associated UI.

I. Genre Map and UI

The genre map comprises a spatial mapping (e.g., arrangement) of a plurality of musical genres. As non-limiting examples, the genres may be arranged in the genre map according to: a user-specified arrangement, an arbitrary arrangement, a rule-based arrangement or a data-based arrangement. A user-specified arrangement comprises an arrangement that is produced by the user. For example, a user may place the genres in the genre map wherever the user desires. An arbitrary arrangement comprises an arrangement that is specified by a person or entity other than the user but is not based on an underlying set of rules or data. A rule-based arrangement comprises an arrangement generated according to an underlying set of rules or guidelines. A data-based arrangement comprises an arrangement generated based on a set of data utilized in conjunction with an underlying set of rules or guidelines.

As a non-limiting example, it may be desirable to utilize an arrangement based on data collected from listeners. Given listeners of a particular genre, the data indicates which other genres the listeners like and/or listen to. In such a manner, a relative spatial relationship (the arrangement) between a plurality of genres can be obtained by considering which genres are commonly enjoyed among a base of listeners.

Figure 2:
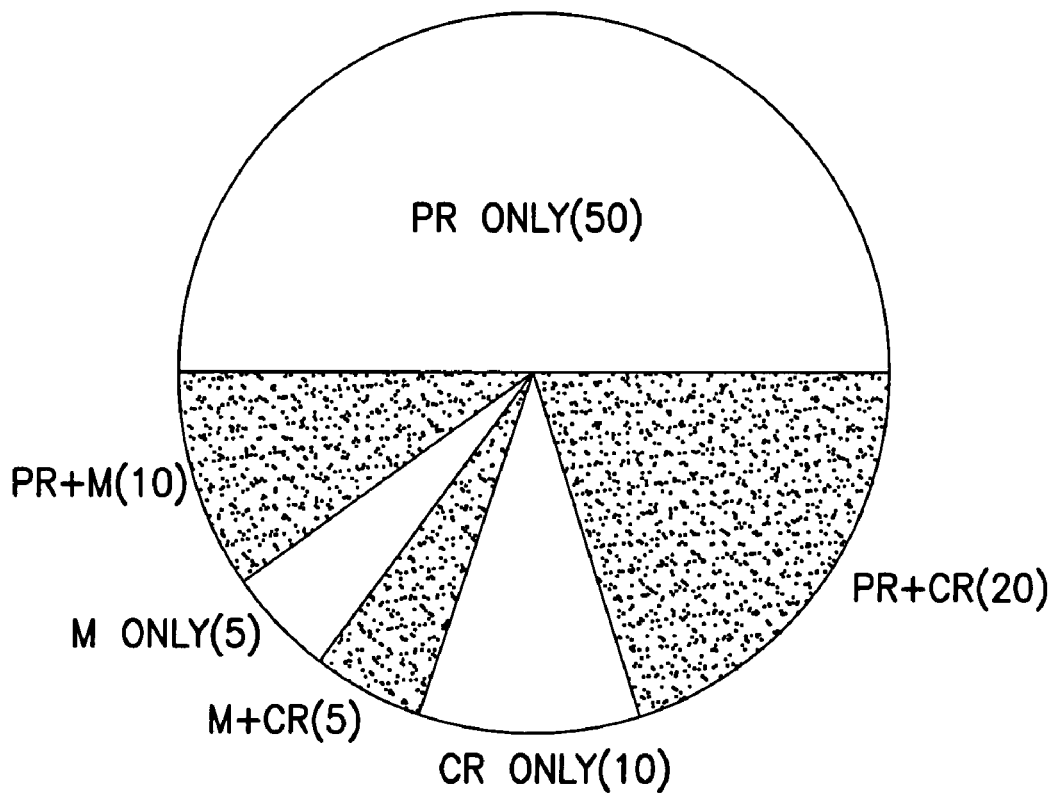
FIG. 2 shows a pie chart of the data used in the exemplary genre map of FIG. 3.
Figure 3:
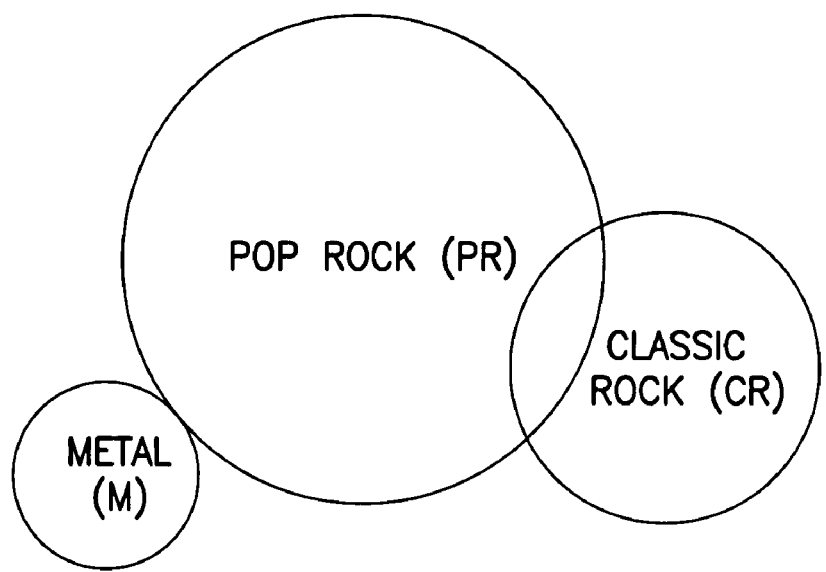
FIG. 3 depicts an exemplary genre map based on the data shown in FIG. 2 and a given set of guidelines.

As a non-limiting example, and with reference to FIGS. 2 and 3, assume that data is gathered from 100 listeners and indicates that: 50 like only Pop Rock (PR), 20 like Pop Rock and Classic Rock (PR+CR), 10 like only Classic Rock (CR), 5 like Metal and Classic Rock (M+CR), 5 like only Metal and 10 like Pop Rock and Metal (PR+M). FIG. 2 shows a pie chart of the data. Furthermore, assume that the arrangement of genres will place genres closer to one another if they have a larger overlap of listeners while also placing genres farther from one another if they have a smaller or no overlap of listeners. In addition, assume that a genre map based on this arrangement of the genres correlates the size of the genre map components for the genres with the relative size of the genre's listener base as compared with the other genres. That is, genres with a larger listener base will have a larger genre map component. FIG. 3 shows an exemplary genre map based on this set of data and guidelines. As can be seen, the genre map components for Pop Rock and Classic Rock overlap due to the relatively large overlap in listeners while Pop Rock and Metal are merely touching based on the relatively small overlap. In addition, Pop Rock has the biggest genre map component due to Pop Rock having the largest number of listeners. In contrast, Metal has the smallest genre map component.

Figure 4:
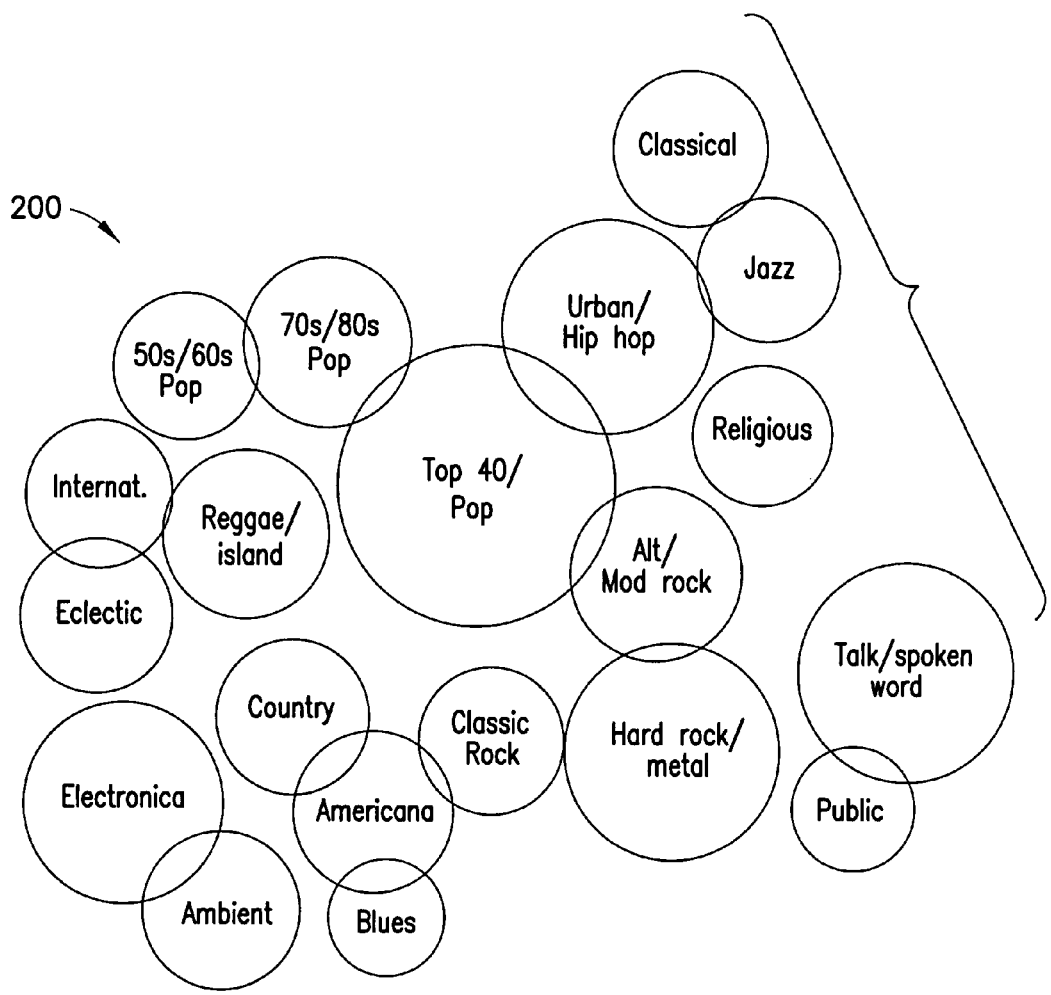
FIG. 4 depicts another exemplary genre map.

FIG. 4 depicts another exemplary genre map 200 wherein the musical genres are arranged such that genres having similar music are closer to one another while genres having different music are farther from one another. As such, the exemplary genre map 200 of FIG. 4 comprises a rule-based arrangement.

A genre UI can be created based on a genre map. The difference between a genre UI and a genre map is that a genre UI allows a user to interact with the components (e.g., objects, elements) of the genre UI. That is, a genre map serves as the basis for a genre UI (which a user can view and interact with). In some exemplary embodiments, a user may be able to modify the genre map in addition to being able to interact with the genre UI.

Figure 5:
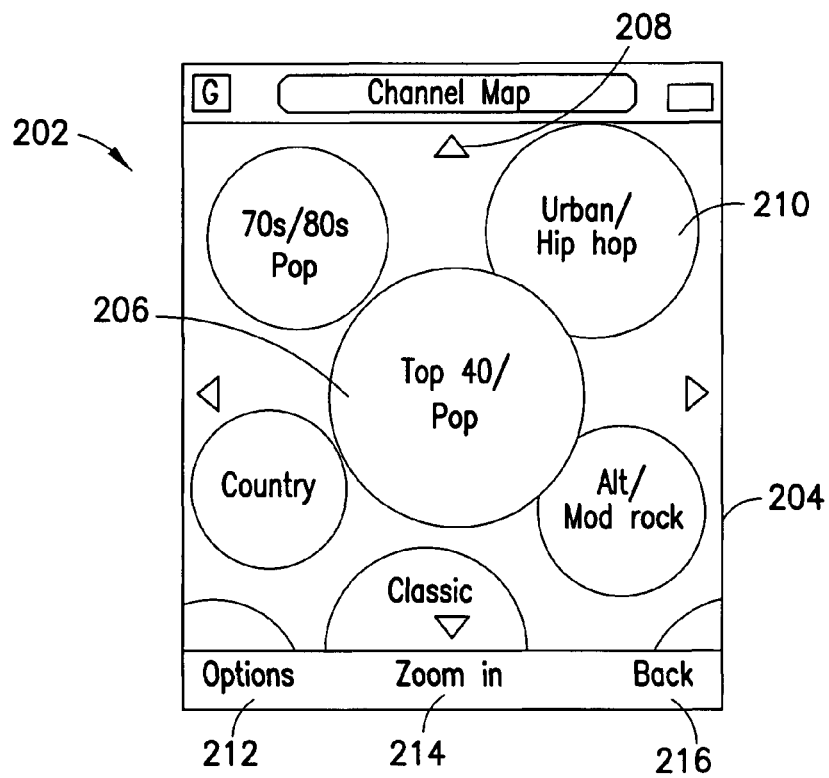
FIG. 5 shows an exemplary genre user interface (UI) based on the exemplary genre map of FIG. 4.

FIG. 5 shows an exemplary genre UI 202 based on the exemplary genre map 200 of FIG. 4. Due to the size of the display area (e.g., display screen 204), only a portion of the exemplary genre map 200 is visible in FIG. 5. The genre UI 202 comprises a plurality of genre objects. Note that in the exemplary genre UI of FIG. 5, a highlighted genre object 206, which corresponds to "Top 40/Pop," is centered on the display screen 204.

As utilized herein, the individual UI objects are referred to herein as UI objects (generally), genre objects (for a genre UI), station objects (for a station UI) or by the genre, station or function associated with the given object. This is due to the fact that, for example, the genre objects each correspond to a genre of the genre map, as explained herein. As such, at times, it may be more convenient to refer to and identify the genre object by the associated genre (e.g., as shown in a visual textual label associated with the genre object) rather than as continually identifying it as "the genre object."

Furthermore, it is noted that a UI object may comprise text, graphics, textual elements, graphical elements or combinations thereof. For example, it may be desirable for the genre objects, as explained below, to be represented in the genre UI as an identifiable shape (e.g., a circle) having a textual label inside identifying the associated genre (e.g., "Top 40/Pop" 206). As an additional non-limiting example, and as explained below with respect to FIG. 12, it may be desirable for the station objects to be represented in the station UI as an identifiable shape (e.g., a small circle) having a textual label below it identifying the associated station (e.g., Superhits.fm 708). As further non-limiting examples, and also as further explained below, it may be desirable to provide directional indications without any associated text (e.g., up arrow 208) or a portion of text enabling a user to access other functions (e.g., "Options" 212 for opening an options menu) or perform an operation (e.g., "Zoom In" 214 for selecting/zooming in on a selected genre; "Back" 216 for returning a user to what was previously viewed). The UI objects may correspond to one or more user inputs that enable a user to access the associated function of the UI object. For example, "Options" 212 may indicate that a user can open an options menu by pressing a key on a touchpad that is located below or near the "Options" 212 UI object.

A UI object (e.g., a genre object, a station object) generally comprises a visual element having at least two dimensions. In other exemplary embodiments, a UI object may comprise a different number of dimensions (e.g., a three-dimensional visual object, for example, as utilized in conjunction with a three-dimensional UI).

The below-described aspects of genre objects, the genre map and the genre UI are presented as non-limiting examples to illustrate potential implementations of the exemplary embodiments of the invention. A genre in the exemplary genre map 200 and exemplary genre UI 202 may be visually represented as a circular genre object (e.g., genre object 206 corresponding to Top 40/Pop). The scale of the genre object may be proportional to a measure of its size (e.g., number of listeners, number of radio stations in that genre). The minimum diameter of the genre object may correspond to the minimum number of characters for a genre name or genre indicator. The maximum diameter may correspond to a value twice that of the minimum diameter but no more than 50% of the screen width or height. It may be desirable for the genre object to have room within it to display the corresponding genre name or genre indicator. The genre object may have six states, including: unselected (e.g., default), selected and when the object is mapped to one of the 'rocker-up,' 'rocker-down,' 'rocker-left' or 'rocker-right' functions on the keypad (e.g., such that the genre object will be selected by pressing the corresponding rocker direction, as further explained below).

In some exemplary embodiments, genre objects can overlap on the genre map or genre UI. The amount of overlap permitted may be proportional to the diameter of the smaller of the two, overlapping genre objects. In some exemplary embodiments, the permitted amount of overlap may not exceed 20% of a genre object's diameter. Regardless of overlap, it may be desirable to have the selected (e.g., highlighted) genre object brought to the front of any overlaps such the selected genre object is not covered.

With regards to the genre map and genre UI, it may be desirable to have no empty space shown that is greater than 45% of the screen width or height (whichever is lesser). Furthermore, it may be desirable to have the total area of the map provide an average of at least four genre objects per screen, with the map having a square aspect ratio. In addition, it may be desirable to locate the genre object corresponding to the most popular genre in the center of the genre map and/or genre UI and have that genre object be selected by default when the genre map and/or genre UI is loaded. It may also be desirable to locate the currently-selected genre object (e.g., genre object 206) at the center of the display (e.g., display screen 204) or at the center of the viewable area of the display.

Navigation within the genre map and/or genre UI may be accomplished utilizing a user input, such as voice input, a keypad, a rocker pad, a stylus, an accelerometer, one or more tilt sensors, one or more other sensors designed to sense movement of or in relation to the device, a mouse, a keyboard, a touchpad or a touch screen, as non-limiting examples. For example, consider navigation based on a rocker pad having at least four identifiable inputs (see FIG. 6), one each corresponding to the four directions of 'up,' 'down,' 'left' and 'right' (e.g., 'rocker-up,' etc.). The genre UI can include directional elements, such as arrows (e.g., up arrow 208 in FIG. 5), that indicate to a user that navigation in a certain direction is possible. Furthermore, the genre UI can highlight or otherwise indicate the options corresponding to the directional elements. For example, in FIG. 5, the up arrow 208 indicates that a user can navigate "upwards" from the currently-selected (e.g., highlighted) genre object 206 (Top 40/Pop). Another genre object 210 (Urban/Hip Hop) is emphasized to indicate that if the user navigates upwards, that genre object 210 (Urban/Hip Hop) will be selected.

Figure 6:
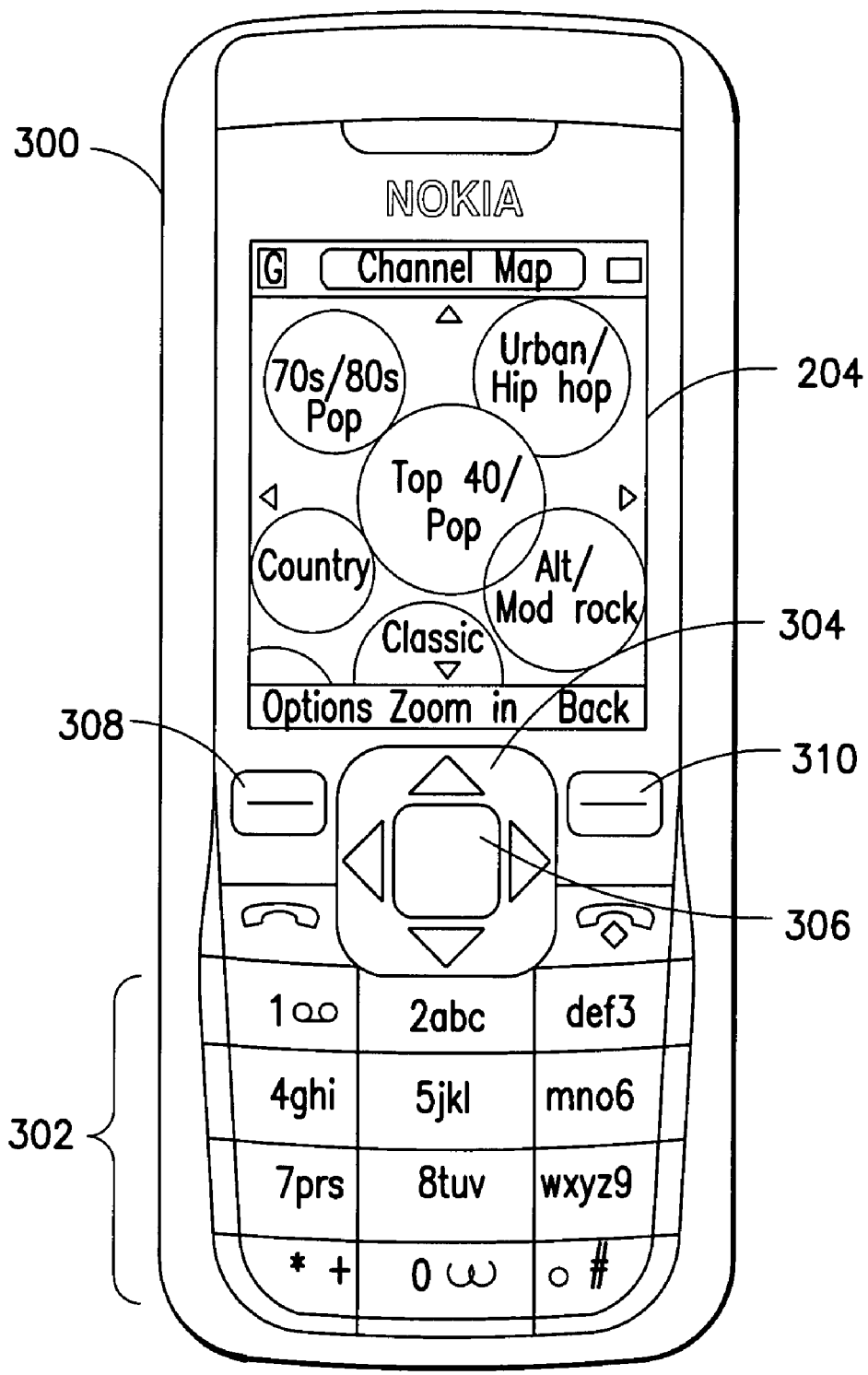
FIG. 6 depicts an exemplary mobile device utilizing the exemplary genre UI shown in FIG. 5.

FIG. 6 depicts an exemplary mobile device 300 utilizing the exemplary genre UI 202 shown in FIG. 5. The mobile device 300 has a number of user inputs including an alphanumeric keypad 302, a rocker 304, a center key 306 (located at the center of the rocker 304), a left menu-key 308 and a right menu-key 310. The rocker 304 comprises inputs for the four directions of up, down, left and right, relative to the mobile device 300. As shown in FIGS. 5 and 6, the "Options" UI object 212 is mapped to the left menu-key 308. The "Back" UI object 216 is mapped to the right menu-key 310. The "Zoom In" UI object 214 is mapped to the center key 306.

To provide a consistent navigational system, it may be desirable to utilize a set of rules or guidelines that identify or determine which genre objects are mapped to the respective navigational directions. The following is a non-limiting example of such a navigational mapping technique. The next navigable genre from the currently-selected genre, in any of the four directions (up, down, left, right), is the nearest genre measured orthogonally along x and y axes, so long as it is not more than 45 degrees to either side of the axis of motion to which it is being mapped. Measurements are made from center point of one object to center point of the other object. The "relative distance" (d) from the selected genre object to a neighboring genre object is calculated as:

$$d=|x|+|y| \quad (1)$$

Note that the origin (0,0) is assumed to be the center of the selected object (e.g., since the screen is centered on the selected object).

Figure 8:
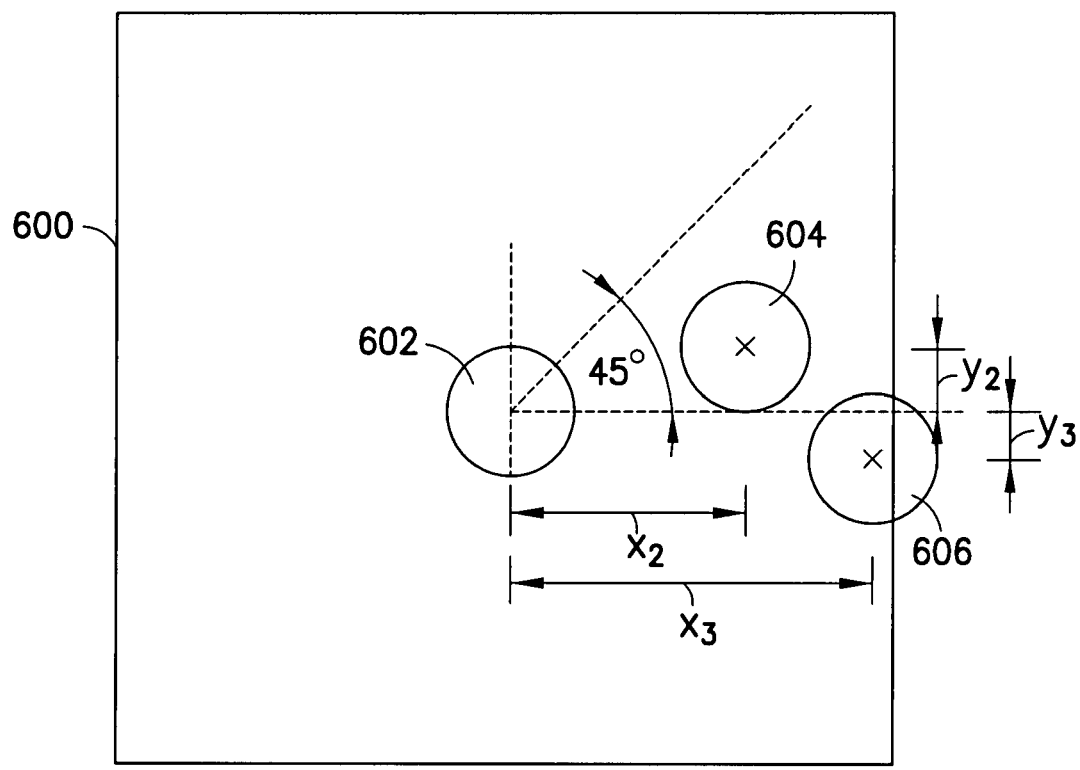
FIG. 8 illustrates an exemplary technique for mapping a UI object to the "right direction" of navigation.

FIG. 8 illustrates this exemplary technique for mapping a UI object to the "right" direction of navigation. In FIG. 8, a display screen 600 has a selected UI object 602 located at the center of the display screen 600. A second UI object 604 is located up and to the right of the selected UI object 602. The relative distance (d) from the center of the selected UI object 602 to the second UI object 604 is calculated as:

$$d=|x|+|y|, \text{ where } |y|<|x| \quad (2)$$

The condition that the modulus of y ($|y|$) be less than the modulus of x ($|x|$) is included because y is the offset from the primary axis (the x axis). Furthermore, this condition requires that the neighboring genre object be within 45 degrees of the centerline for the right direction.

In FIG. 8, for comparison purposes, a third UI object 606 is shown. As can be appreciated, the relative distance ($d_2$) from the selected UI object 602 to the second UI object 604 is less than the relative distance ($d_3$) from the selected UI object 602 to the third UI object 606, indicating that the second UI object 604 is closer to the selected UI object 602. Thus, because it is the closest UI object within the available region for the right direction, the second UI object 604 will be mapped to the right direction such that a user pressing on the 'rocker-right' portion of the rocker pad will cause the second UI object 604 to become the new selected UI object (e.g., re-centering the display area on the second UI object 604 and highlighting the second UI object 604).

In other exemplary embodiments, the distance between the two objects can be measured or calculated in a different manner. As a non-limiting example, assuming that the center of a highlighted object is located at the origin (0,0), the distance to a neighboring object (e.g., the center of the neighboring object, located at (x, y)) may be calculated as:

$$d=\sqrt{x^2+y^2} \quad (3)$$

Figure 9A:
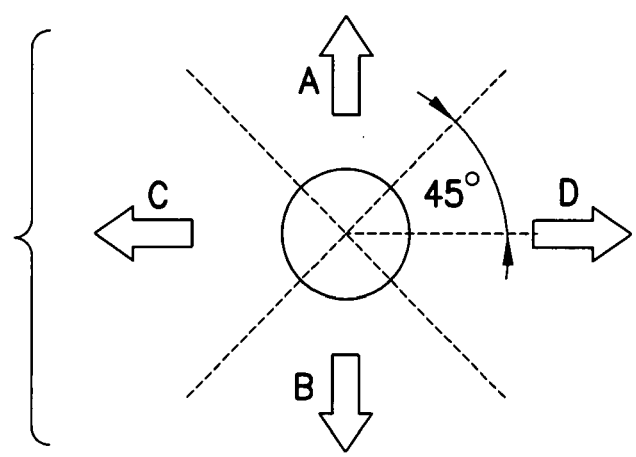
FIG. 9A shows the four regions within which the center of a UI object should be located in order to be mapped to the up, down, left and right directions of navigation, in accordance with the exemplary technique illustrated in FIG. 8.

Based on the exemplary technique of FIG. 8, FIG. 9A shows the four regions A, B, C, D within which the center of a UI object must be located in order to be mapped to the up, down, left and right directions of navigation, respectively.

As is apparent, considering the four cardinal directions of navigation (up, down, left, right), up to four UI objects (e.g., genre objects) can be mapped to navigational directions to obtain up to four navigable objects (e.g., navigable genres).

Figure 9B:
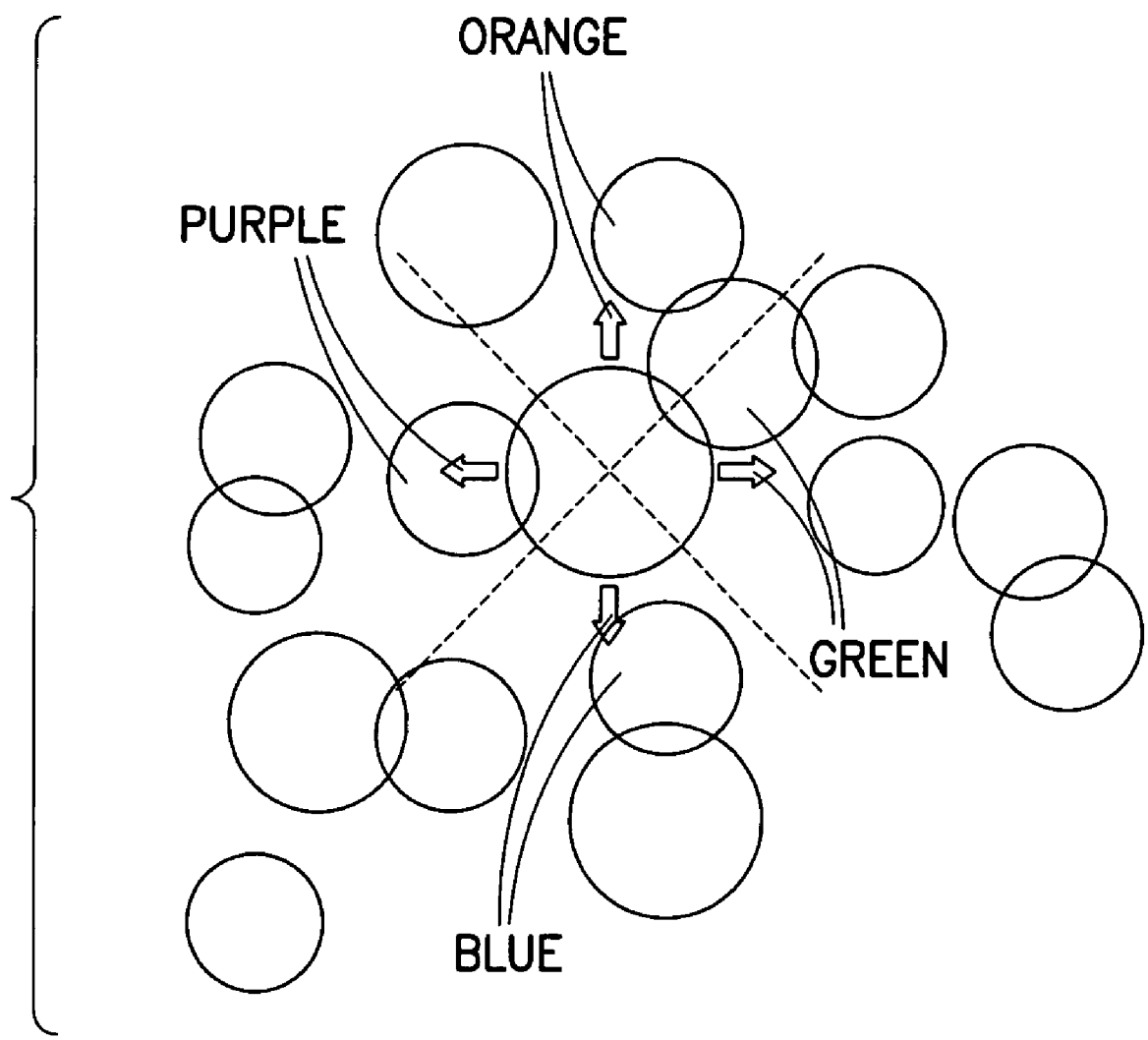
FIG. 9B shows another example of navigational mapping for a genre UI wherein the navigable objects and corresponding arrows are color coded.
Figure 10C:
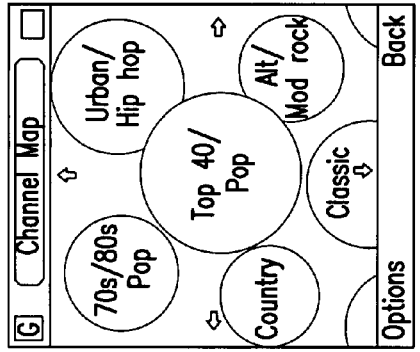
FIGS. 10A-10D illustrate four additional exemplary genre UIs.
Figure 10D:
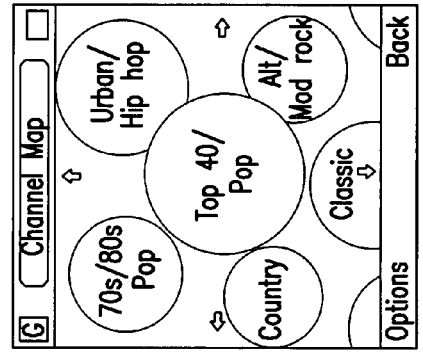
Figure 10A:
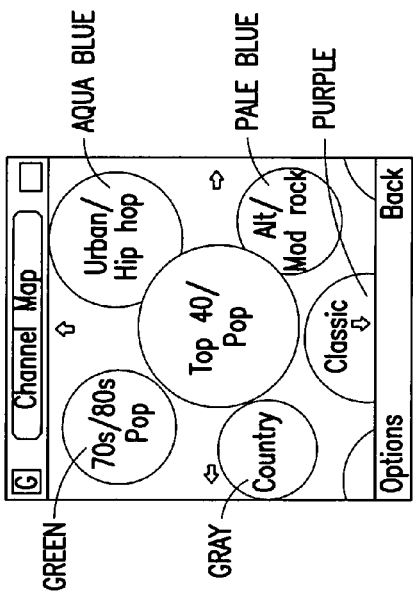
Figure 10B:
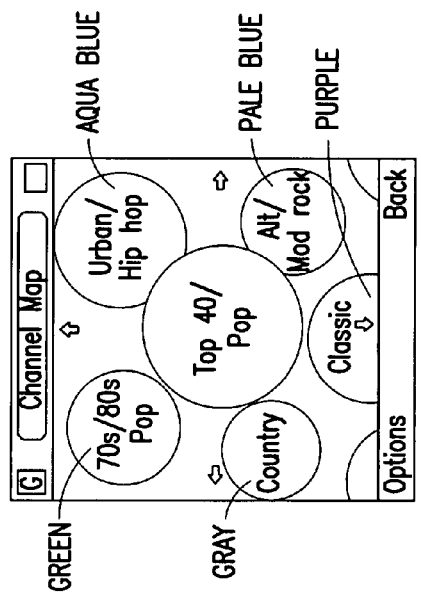

It may be desirable to modify the visual appearance (e.g., emphasis, bolding the text, coloring, tinting, shading) of each navigable genre according to the direction of navigation to which the navigable genre is mapped. FIG. 9B shows another example of navigational mapping for a genre UI wherein the navigable objects and corresponding arrows are color coded.

Furthermore, it may be desirable to include directional objects (e.g., up arrow 208) in the genre UI only for those directions in which navigation is possible. It may be desirable to have the a user input (e.g., keys) currently mapped to an invalid navigation direction be inactive. It may be desirable to have the displayed portion of the genre UI pan smoothly as a user navigates among the genres, with the currently-selected genre located at the center of the display screen. It may also be desirable to ensure that no genre object is inaccessible to the user. In other exemplary embodiments, a specific genre (e.g., a popular genre, a preferred genre) is mapped to an alphanumeric key of a keypad.

Figure 7:
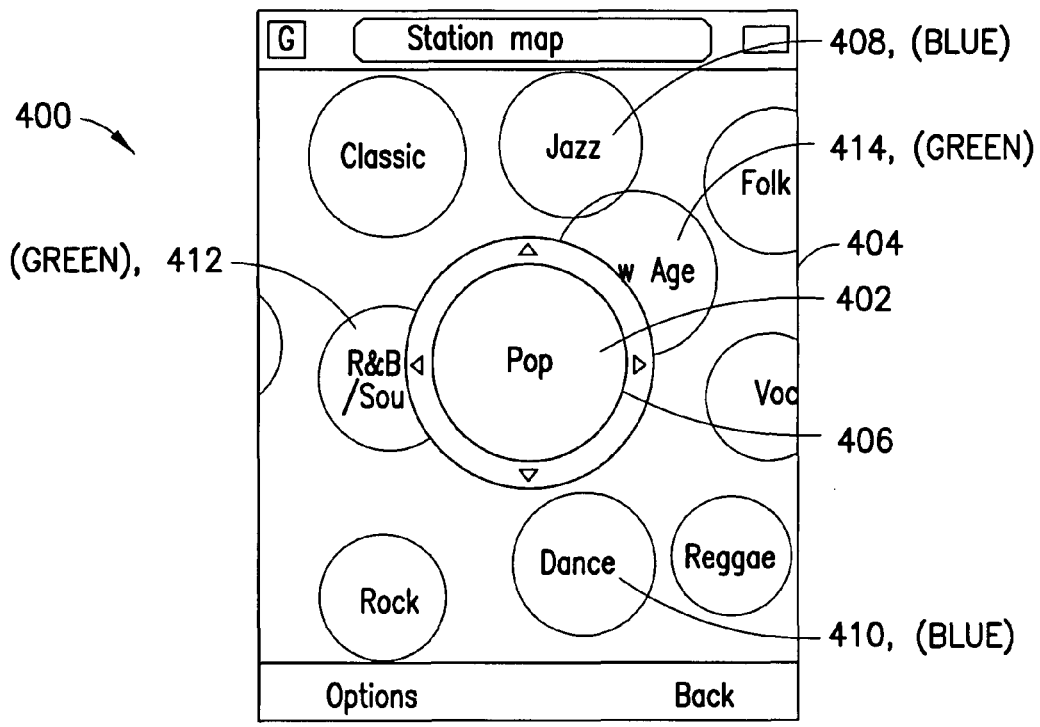
FIG. 7 shows another exemplary genre UI.

FIG. 7 shows another exemplary genre UI 400. As compared with the exemplary genre UI 200 shown in FIG. 5, the arrows of the genre UI 400 are in a different location. In addition, there is no "Zoom In" UI object 214. With the genre UI 400 of FIG. 7, it is assumed that a user would implicitly understand that pressing the center key (e.g., center key 306) selects (e.g., zooms in) the highlighted genre 402 ("Pop") located at the center of the display screen 404.

In FIG. 7, the arrow UI objects, located in a ring 406 that surrounds the highlighted genre 402, are color-coded, with blue for the up and down arrows and green for the left and right arrows. In addition, to identify the navigable genres that correspond to each arrow key (i.e., each direction of navigation), the navigable genres are color-coded in a similar manner as the arrow keys. An up-navigable genre UI object 408 ("Jazz"), which is the navigable genre that would be highlighted if a user were to press the up key, is colored blue to correspond to the blue up arrow. A down-navigable genre UI object 410 ("Dance") is colored blue to correspond to the blue down arrow. A left-navigable genre UI object 412 ("R&B/Soul") is colored green to correspond to the green left arrow. A right-navigable genre UI object 414 ("New Age") is colored green to correspond to the green right arrow. In such a manner, the navigable genres are identified more clearly for a user.

FIG. 10 illustrates four additional exemplary genre UIs. In FIGS. 10(A) and 10(B), the exemplary genre UIs color the individual genre objects shown by the genre UI. In FIGS. 10(B), 10(C) and 10(D), at least some of the genre objects are faded. In FIG. 10(D), the genre UI uses a different scale as compared with the genre UIs of FIGS. 10(A), 10(B) and 10(C).

In some exemplary embodiments, the genre map is supplied by an external entity, such as a service provider, as a non-limiting example. In other exemplary embodiments, the genre map is stored on the network (e.g., on a server) and downloaded to the user equipment (e.g., a mobile device, an electronic device as further described below). In some exemplary embodiments, the genre map is stored locally (e.g., on the user equipment). In other exemplary embodiments, a locally-stored genre map is updated by an external agent (e.g., a server of a connected network). In some exemplary embodiments, when the genre UI is loaded, it displays the same view as was shown by the genre UI prior to a user closing or navigating away from the genre UI.

Selecting (e.g., using a user input) a genre in the genre UI displays (e.g., "zooms in" to) a station UI based on a station map that corresponds to the selected genre.

II. Station Map and UI

The station map comprises a visual representation (e.g., arrangement, spatial mapping) of the radio stations within a selected genre.

As non-limiting examples, the stations may be arranged in the station map according to: a user-specified arrangement, an arbitrary arrangement, a rule-based arrangement or a data-based arrangement. A user-specified arrangement comprises an arrangement that is produced by the user. For example, a user may place the stations in the station map wherever the user desires. An arbitrary arrangement comprises an arrangement that is specified by a person or entity other than the user but is not based on an underlying set of rules or data. A rule-based arrangement comprises an arrangement generated according to an underlying set of rules or guidelines. A data-based arrangement comprises an arrangement generated based on a set of data utilized in conjunction with an underlying set of rules or guidelines.

As a non-limiting example, it may be desirable to utilize an arrangement based on data collected from listeners. Given listeners of a particular station, the data indicates which other stations of the genre the listeners like and/or listen to. In such a manner, a relative spatial relationship between a plurality of stations can be obtained by considering which stations in the genre are commonly enjoyed among a base of listeners. As a non-limiting example, the implementation of such an arrangement may parallel the implementation described above with respect to FIGS. 2 and 3 for genres.

Figure 11:
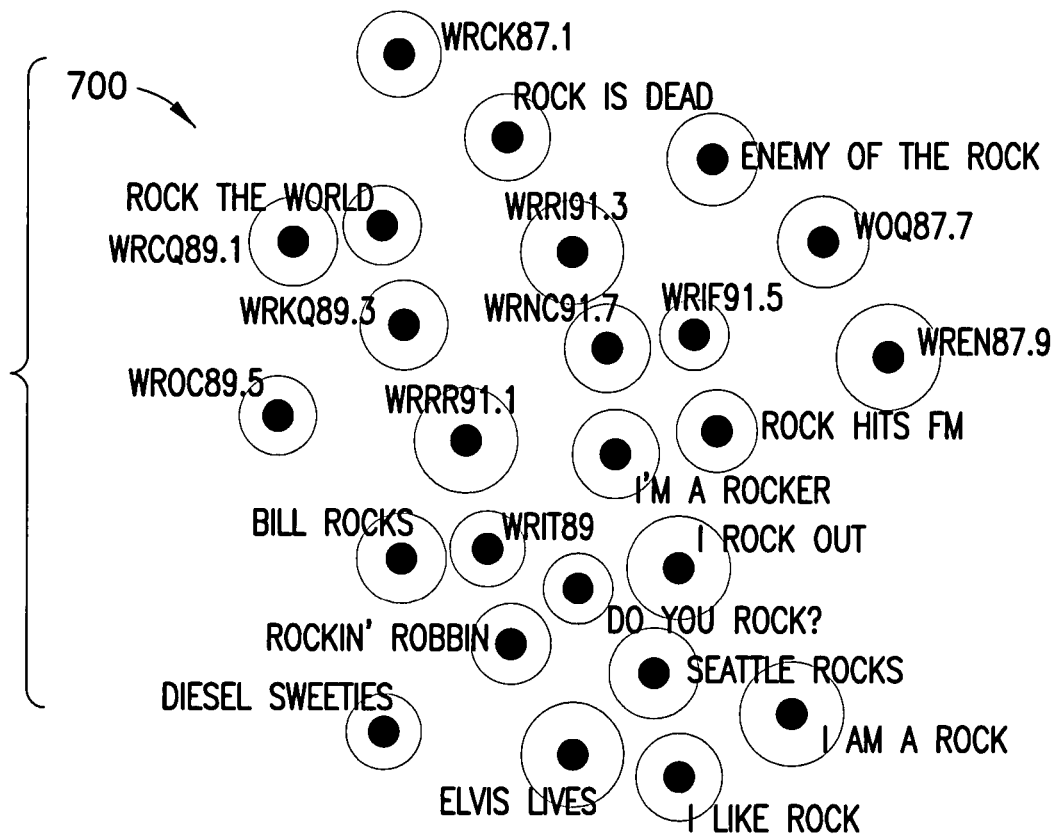
FIG. 11 depicts an exemplary station map for a genre.

FIG. 11 depicts an exemplary station map 700 for the genre "Rock." Since the station map 700 is for the "Rock" genre, the radio stations shown in the station map 700 comprise radio stations that are in the "Rock" genre (e.g., radio stations that primarily play Rock music). Note that the lighter, outer circle around each station is for spacing purposes, as described below with respect to station objects in a station UI. In other exemplary embodiments, the outer circle may not be included, utilized or shown.

The stations of the station map 700 include both FM radio stations as well as internet radio stations. In other exemplary embodiments, the station map may comprise only one type of radio stations. In further exemplary embodiments, the station map may comprise different types of radio stations, such as FM radio stations, satellite radio stations, internet radio stations and local network radio stations, as non-limiting examples. In other exemplary embodiments, the radio stations may be arranged in the station map such that stations having an overlapping listener base are closer to one another than stations that have less of an overlap or none at all.

A station UI can be created based on a station map. The difference between a station UI and a station map is that a station UI allows a user to interact with the components (e.g., objects, elements) of the station UI. That is, a station map serves as the basis for a station UI (which a user can view and interact with). In some exemplary embodiments, a user may be able to modify the station map in addition to being able to interact with the station UI.

Figure 12:
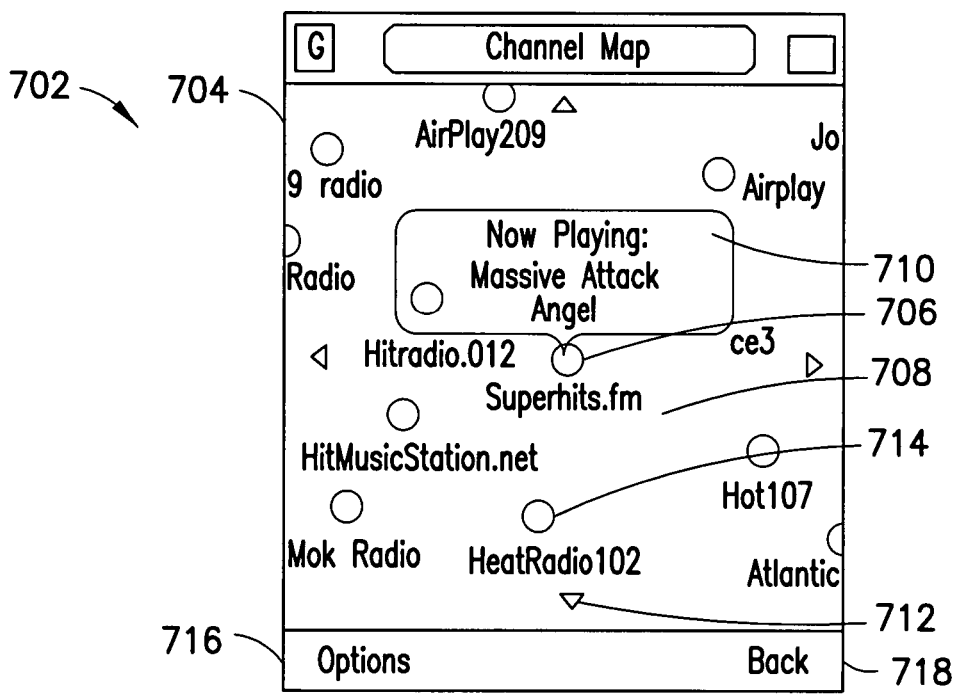
FIG. 12 shows an exemplary station UI.

FIG. 12 shows an exemplary station UI 702 based on an exemplary station map (not shown). Due to the size of the display area (e.g., display screen 704), only a portion of the exemplary station map 700 is visible in FIG. 12. The station UI 702 comprises a plurality of station objects. Note that in the exemplary station UI of FIG. 12, a highlighted station object 706, which corresponds to "Superhits.fm," so identified by text 708 located below the highlighted station object 706, is centered on the display screen 704.

The exemplary station UI 702 also includes an information bubble 710 that comprises text providing additional information about the highlighted station 706, such as the current song (e.g., song title, artist) or a description of the station (e.g., station name, description of the station, description of the current disc jockey of the station, description of the current radio station show), as non-limiting examples. In the exemplary station UI 702 of FIG. 12, the highlighted station 706 is currently playing a song titled "Angel" by the artist "Massive Attack." In other exemplary embodiments, additional information (e.g., the information bubble 710) may not be available. In further exemplary embodiments, additional information may be provided (e.g., shown) in a different location on the display screen (e.g., different from the information bubble 710).

In one exemplary embodiment, and as shown in FIG. 12, stations with a correlating listener base are closer to each other on the station UI 702. This can be determined, for example, by comparing the general behavior of listeners in terms of the stations they listen to. This can assist in determining a level of similarity between two stations. For example, as show in FIG. 12, Superhits.fm and HitMusicStation.net are more closely related to each other as compared to Superhits.fm and HeatRadio102. Thus, the likelihood of finding similar music is higher between the former as compared to the latter. As an additional non-limiting example, it is possible to determine a level of similarity between two radio stations by comparing playlists of the two radio stations. This procedure could be automated. Similar concepts may be utilized to arrange the radio stations based on popularity, for example, with the most popular station shown in the center of the station UI 702 and the less popular stations arranged towards the edges of the station UI 702.

The below-described aspects of station objects, the station map and the station UI are presented as non-limiting examples to illustrate potential implementations of the exemplary embodiments of the invention. A station in the exemplary station map 700 and/or the exemplary station UI 702 may be visually represented as a small circular station object (e.g., station object 706 corresponding to Superhits.fm). The scale of the station object may be proportional to a measure of its size (e.g., average number of listeners, current number of listeners). The minimum diameter of the station object may be predefined. The maximum diameter may correspond to a value 250% that of the minimum diameter. The station object may have six states, including: unselected (e.g., default), selected and when the object is mapped to one of the 'rocker-up,' 'rocker-down,' 'rocker-left' or 'rocker-right' functions on the keypad (e.g., such that the station object will be selected by pressing the corresponding rocker direction, as further explained herein).

In some exemplary embodiments, each radio station in the exemplary station map 700 has an invisible exclusion zone around it, so represented in the exemplary station map 700 by the outer circle surrounding each station. The exclusion zones of two radio stations should not overlap. The diameter of the exclusion zone may comprise a value 300% that of the diameter of the surrounded radio station object. Generally, it may be desirable to have the exclusion zone not be visible to a user.

With regards to the station map and station UI, it may be desirable to have no empty space shown that is greater than 45% of the screen width or height (whichever is lesser). Furthermore, it may be desirable to have the total area of the map provide an average of at least eight station objects pet screen, with the map having a square aspect ratio. In addition, it may be desirable to locate the station object corresponding to the most popular station in the center of the station map and/or station UI and have that station object be selected by default when the corresponding station map and/or station UI is loaded. It may also be desirable to locate the currently-selected station object (e.g., station object 706) at the center of the display (e.g., display screen 704) or at the center of the viewable area of the display.

Navigation within the station map and/or station UI may be accomplished utilizing a user input, such as voice input, a keypad, a rocker pad, a stylus, an accelerometer, one or more tilt sensors, one or more other sensors designed to sense movement of or in relation to the device, a mouse, a keyboard, a touchpad or a touch screen, as non-limiting examples. For example, consider navigation based on a rocker pad having at least four identifiable inputs (e.g., FIG. 6), one each corresponding to the four directions of 'up,' 'down,' 'left' and 'right' (e.g., 'rocker-up,' etc.). The station UI can include directional elements, such as arrows (e.g., down arrow 712 in FIG. 12), that indicate to a user that navigation in a certain direction is possible. Furthermore, the station UI can highlight or otherwise indicate the options corresponding to the directional elements. For example, in FIG. 12, the down arrow 712 indicates that a user can navigate "downwards" from the currently-selected (e.g., highlighted) station object 706 (Superhits.fm). Another station object 714 (HeatRadio102) is emphasized to indicate that if the user navigates downwards, that station object 714 (HeatRadio102) will be selected. As non-limiting examples, the emphasis may comprise bolding the text and/or station object, highlighting the text and/or station object, coloring the text and/or station object or changing the shape of the station object.

The exemplary station UI 702 may be utilized in conjunction with an electronic device, such as the exemplary mobile device 300 of FIG. 6, as a non-limiting example. Furthermore, the exemplary station UI 702 may be utilized, as a non-limiting example, in a similar manner as described above with respect to the genre UI 202 and the exemplary mobile device 300. As non-limiting examples, an "Options" 716 station UI object can be mapped to the left menu-key 308 and a "Back" 718 station UI object can be mapped to the right menu-key 310. In other exemplary embodiments, the exemplary station UI 702 may be utilized in a different manner than the genre UI (e.g., genre UI 202). Note that the "Back" option 718 enables a user to return to the previously-viewed screen, such as the genre UI, for example.

As a further non-limiting example, the center key 306 may be used to activate (e.g., tune in) the station corresponding to the currently-selected station object 706. That is, in one exemplary embodiment, the audio of the selected station does not automatically play as soon as the object is selected (e.g., centered). Instead, the previously-played audio, corresponding to the previously-selected (e.g., centered) continues to play. In such a manner, a user can navigate among the station map, using the station UI, and view additional stations without automatically tuning in when the station is selected (e.g., centered).

Figure 13:
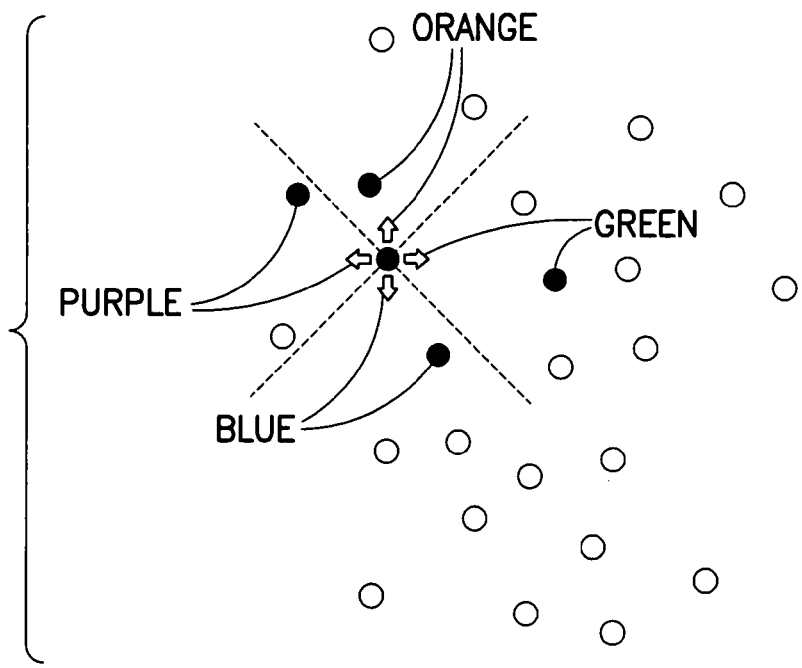
FIG. 13 shows an example of navigational mapping for a station UI wherein the navigable objects and corresponding arrows are color coded.

To provide a consistent navigational system, it may be desirable to utilize a set of rules or guidelines that identify or determine which genre objects are mapped to the respective navigational directions. As a non-limiting example, the above-described navigational mapping techniques and aspects for genres (e.g., with respect to FIGS. 8, 9A and 9B) similarly may be utilized as navigational mapping techniques and aspects for stations. As a non-limiting example, FIG. 13 shows an example of navigational mapping for a station UI wherein the navigable objects and corresponding arrows are color coded.

Figure 14:
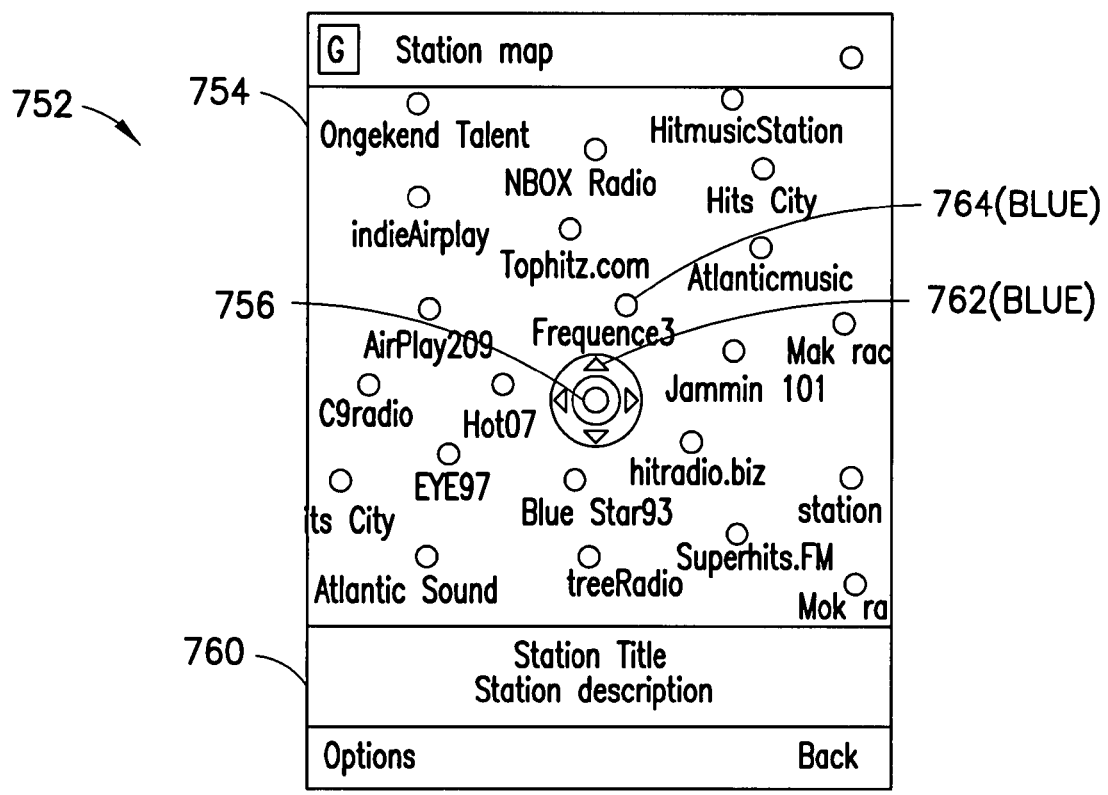
FIG. 14 shows another exemplary station UI.

FIG. 14 shows another exemplary station UI 752. In contrast to the information bubble 710 in the station UI 702 of FIG. 12, the station UI 752 of FIG. 14 features an information bar 760 located towards the bottom of the display (e.g., display screen 754). Similar to the information bubble 710, the information bar 760 comprises text providing additional information about the highlighted station 756, such as the current song (e.g., song title, artist) or a description of the station (e.g., station name, description of the station, description of the current disc jockey of the station, description of the current radio station show), as non-limiting examples. In the exemplary station UI 752 of FIG. 14, the name of the highlighted station 756 is "Station Title" and a description of "Station Title" is "Station description." Furthermore, in the exemplary station UI 752, the arrows and corresponding station UI objects comprise a same color. For example, both the up arrow 762 and the corresponding station UI object 764 ("Frequence3") are blue. This is substantially similar to other exemplary embodiments described above, such as in FIGS. 9B, 10A and 13, as non-limiting examples. In further exemplary embodiments, the arrows may point to the corresponding station UI object that will be visited (e.g., selected, upon which the UI will center) if the key corresponding to that direction is pressed. For example, instead of pointing upwards, up arrow 762 may point to Frequence3 764, indicating that Frequence3 764 is the station UI object that will be selected if the user navigates "upwards" (e.g., by pressing the "up" rocker key).

Although the station UIs discussed above are described as showing stations associated with the selected genre, in other exemplary embodiments, the station map and/or the station UI may display stations associated with other genres, such as from a genre close to the selected genre (e.g., close to the selected genre on the genre map).

In further exemplary embodiments, the station map may comprise a size and shape similar to the genre map. That is, the station map may comprise a version of the genre map that shows additional details at least in the form of respective stations within the genres. In such an exemplary embodiment, the station UI would be based on a viewable portion of the station map, as determined based on the scale of the station map and the size of the viewable area. This exemplary embodiment is further illustrated and described below with respect to FIGS. 15A-15E.

Figure 15A:
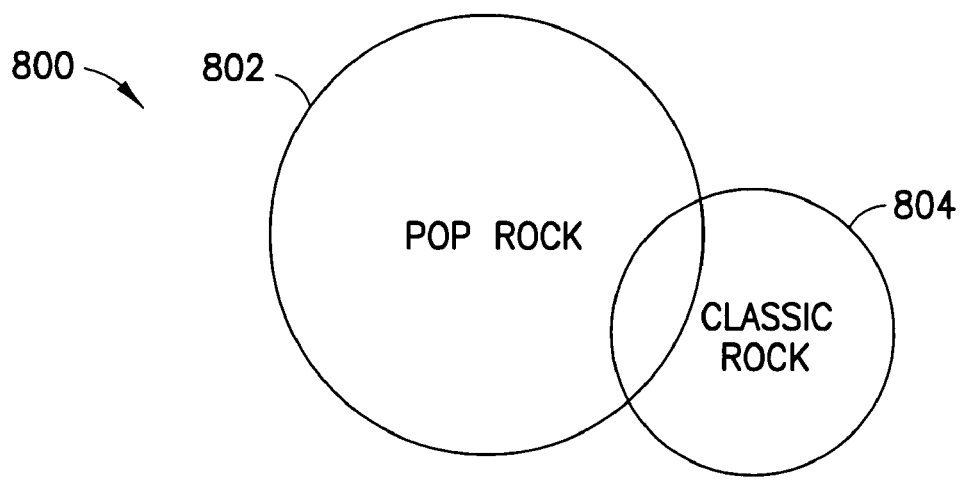
FIG. 15A depicts another exemplary genre map comprising two genres, Pop Rock and Classic Rock.
Figure 15B:
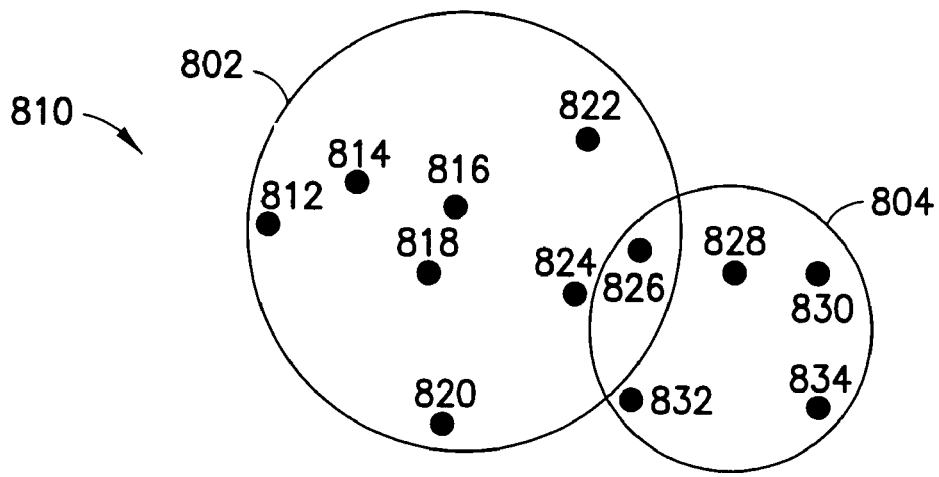
FIG. 15B illustrates an exemplary station map that comprises a version of the genre map of FIG. 15A showing addition detail in the form of radio stations.
Figure 15C:
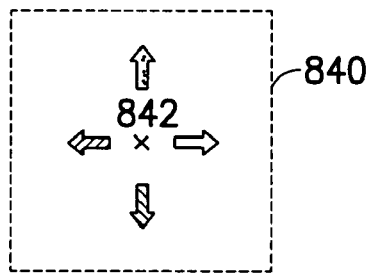
FIG. 15C shows a viewable area corresponding to a portion of the station map of FIG. 15B that can be viewed at one time on a display utilizing a station UI based on the station map of FIG. 15B.

FIG. 15A depicts another exemplary genre map 800 comprising two genres, Pop Rock 802 and Classic Rock 804. FIG. 15B illustrates an exemplary station map 810 that comprises a version of the genre map 800 of FIG. 15A showing additional detail in the form of radio stations 812-834. For convenience, it will be assumed that the stations 812-834 with each have a station name identical to their respective number (e.g., "station 812"). FIG. 15C shows a viewable area 840 corresponding to a portion of the station map 810 that can be viewed at one time on a display utilizing an exemplary station UI based on the station map 810. The viewable area 840 is centered (center "x" 842) on a selected station. In addition, the viewable area 840 includes arrows corresponding to navigable directions. The navigable direction arrows and corresponding navigable station(s) are colored, shaded or otherwise indicated using a same color, pattern or other suitable indication. Furthermore, the selected station is marked with an "x." Note that in some exemplary embodiments, a user may be able to navigate through the station map 810 without automatically selecting a station. In such a manner, a user may listen to a selected station while navigating through the station map 810. Upon finding a station that the user desires to listen to, the user can select that station. In further exemplary embodiments, the "x" can be moved through the station may 810 before a station is selected. In such a manner, navigation may be faster and/or more convenient. In such an exemplary embodiment, the colors of where the next navigation would lead may follow the "x."

Figure 15D:
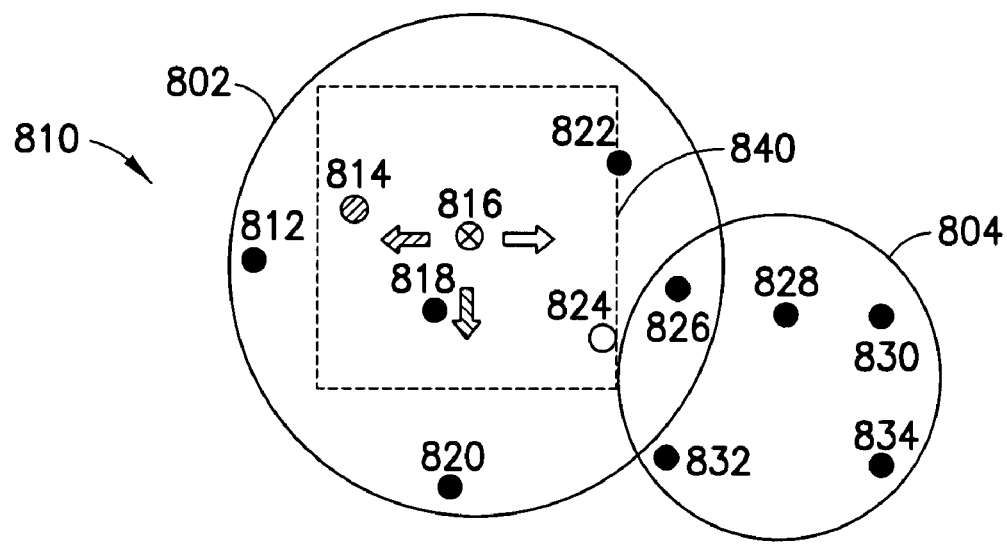
FIG. 15D shows the station map of FIG. 15B with station 816 as the selected station

FIG. 15D shows the station map 810 of FIG. 15B with station 816 as the selected station. That is, the viewable area 840 is centered on station 816, the selected station. As shown in FIG. 15D, the viewable area 840 only shows stations from the Pop Rock genre 802 (stations 814, 816, 818, 822, 824).

Figure 15E:
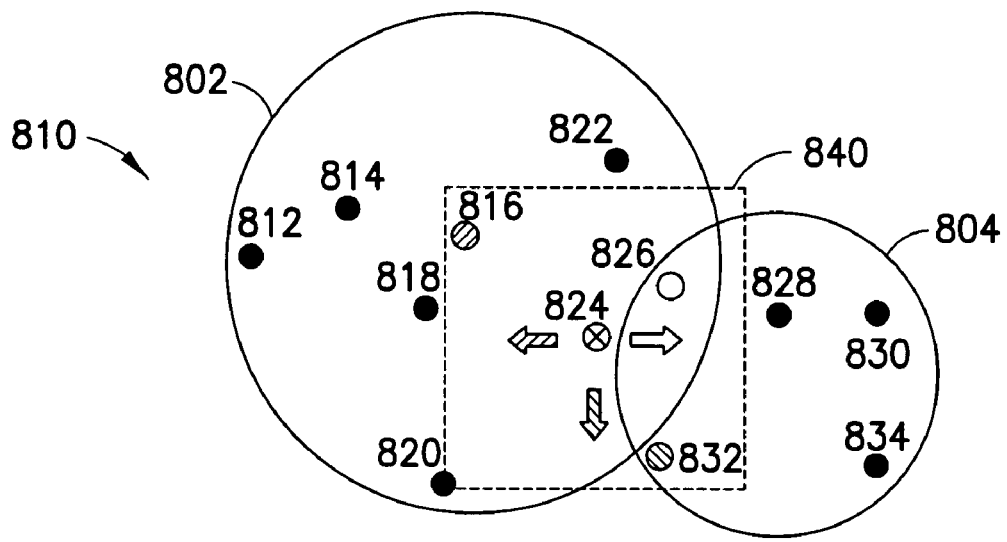
FIG. 15E shows the station map of FIG. 15B with station 824 as the selected station.

FIG. 15E shows the station map 810 of FIG. 15B with station 824 as the selected station. That is, the viewable area 840 is centered on station 824, the selected station. As shown in FIG. 15E, the viewable area 840 includes stations from the Pop Rock genre 802 (stations 816, 824, 826) and the Classic Rock genre 804 (stations 826, 832). In such a manner, having selected station 824, a user can, for example, navigate to station 832 (using the down navigation key) even though station 832 is in a different genre from station 824. This is because the location of station 832 is such that it is "close enough" to station 824 so as to be a navigable option (e.g., navigable station).

Note that as shown in FIGS. 15B, 15D and 15E, station 826 is located in both the Pop Rock genre 802 and the Classic Rock genre 804. This is due to the overlapping nature of the genres on the genre map 800 and may, for example, indicate a relatively high level of overlapping audience. In other exemplary embodiments, no stations may be located in overlap regions. In further exemplary embodiments, the genres on the genre map may not be allowed to overlap.

Figure 16:
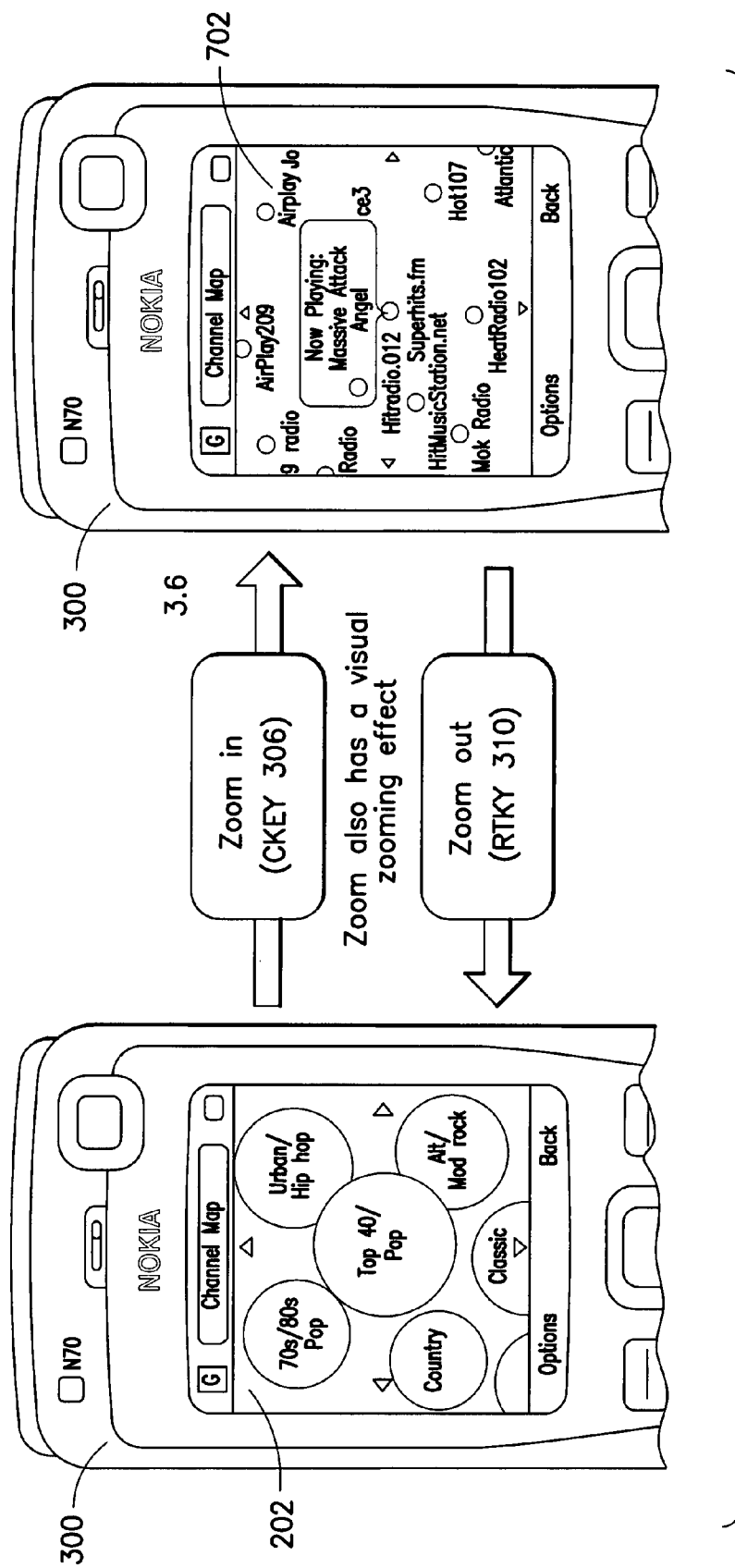
FIG. 16 illustrates exemplary overall interactions between the exemplary genre UI of FIG. 5 and the exemplary station UI of FIG. 12, as utilized in conjunction with the exemplary mobile device of FIG. 6.

FIG. 16 illustrates exemplary overall interactions between the exemplary genre UI 202 of FIG. 5 and the exemplary station UI 702 of FIG. 12, as utilized in conjunction with the exemplary mobile device 300 of FIG. 6. By pressing the center key (CKEY) 306, a user "zooms in" on the selected "Top 40/Pop" genre (by way of the genre object 206 corresponding to the Top 40/Pop genre) to reach the station UI 702 for "Top 40/Pop." Once at the station UI 702, the default radio station 706 selection of "Superhits.fm" is initially selected and/or automatically played. By pressing the key on the keypad corresponding to the "Back" command 718 (the right menu key, RTKY, 310), the user can "zoom out" from the station UI 702 for "Top 40/Pop" to reach the genre UI 202 for the "Top 40/Pop" genre.

While the exemplary embodiments have been described above in the context of radio stations, it should be appreciated that the exemplary embodiments of this invention are not limited for use with only this one particular type of content provider, and that they may be used to advantage in conjunction with other types of content providers, such as television stations, video hosts and audio providers, as non-limiting examples.

Furthermore, while the exemplary embodiments have been described above in the context of genres of music, it should be appreciated that the exemplary embodiments of this invention are not limited for use with only this one particular type of classification, and that they may be used to advantage in conjunction with other categories, classifications and types of categorization. As non-limiting examples, the categories may be user-specified, user-defined or provided by a source external to the user equipment (e.g., a service provider).

Figure 17:
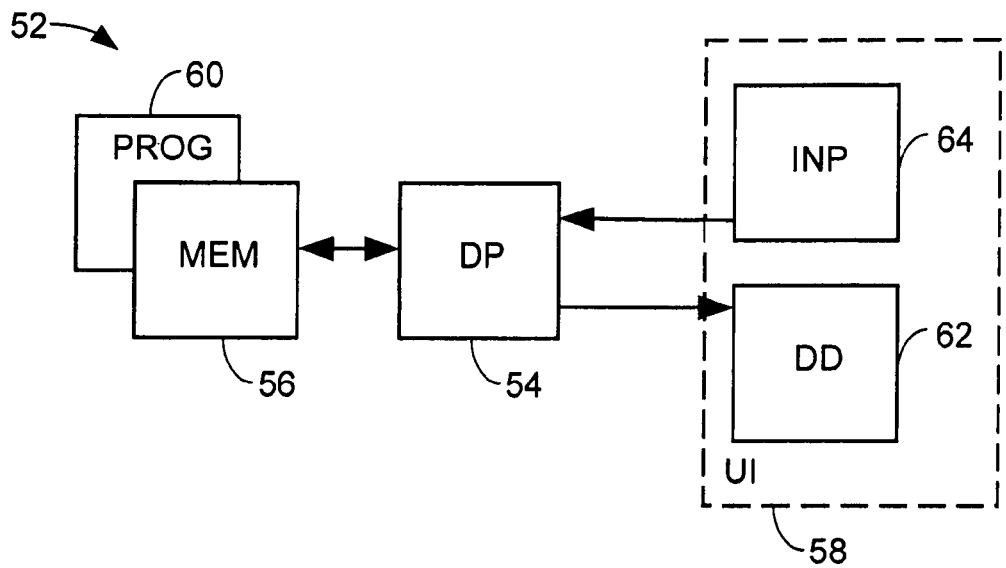
FIG. 17 illustrates a simplified block diagram of an electronic device that is suitable for use in practicing the exemplary embodiments of this invention.

Reference is made to FIG. 17 for illustrating a simplified block diagram of various electronic devices that are suitable for use in practicing the exemplary embodiments of this invention. In FIG. 17, an electronic device 52 includes a data processor (DP) 54, a memory (MEM) 56 coupled to the DP 54 and a user interface (UI) 58 coupled to the DP 54. The MEM 20 stores a program (PROG) 60. The UI 56 includes a display device (DD) 62 and an input device (INP) 64. The PROG 60 is assumed to include program instructions that, when executed by the DP 54, enable the electronic device 52 to operate in accordance with the exemplary embodiments of this invention, as discussed herein. The DD 62 is configured to display information (e.g., graphics, text or combinations thereof, as non-limiting examples) to a user. The INP 64 is configured to receive an input from a user.

In general, the various exemplary embodiments of the electronic device 52 can include, but are not limited to, cellular phones, personal digital assistants (PDAs), computers, image capture devices (e.g., digital cameras), gaming devices, music storage and playback appliances, Internet appliances, monitors having a user input, display screens having a user input and touch screens, as well as units or terminals that incorporate combinations of such functions.

The exemplary embodiments of this invention may be implemented by computer software executable by the DP 54, or by hardware, or by a combination of software and hardware.

The MEM 56 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DP 54 may be of any type suitable to the local technical environment, and may include one or more of general purpose computers, special purpose computers, microprocessors, digital signal processors (DSPs) and processors based on a multi-core processor architecture, as non-limiting examples.

The DD 62 may be of any type suitable to the local technical environment, and may include one or more cathode ray tube (CRT) displays, liquid crystal displays (LCDs), plasma displays (e.g., plasma display panels, PDPs), digital light processing (DLP) projectors or displays, light-emitting diode (LED) displays, organic light-emitting diode (OLED) displays, liquid crystal on silicon (LCOS) displays, surface-conduction electron-emitter displays (SEDs), field emission displays (FEDs), interferometric modulator displays (IMODs), virtual retinal displays (VRDs), electroluminescent displays (ELDs), laser displays, carbon nanotube (CNT) displays and nanocrystal displays, as non-limiting examples.

The INP 64 may be of any type suitable to the local technical environment, and may include one or more keys, dials, buttons, keyboards, keypads (e.g., alphanumeric keypad), touchpads, touch screens, touch sensors, joysticks, gamepads, analog sticks, mouse, trackballs, accelerometers, tilt sensors, other sensors designed to sense movement of or in relation to the device, microphones, sound input devices, video cameras, cameras or optical recognition devices, as non-limiting examples.

In other exemplary embodiments, the functionality of one or more of the DP 54, the MEM 56 and the PROG 60 may be performed by one or more components of the DD 62 and/or the INP 64. In further exemplary embodiments, and as discussed below with respect to FIG. 18, the electronic device 52 may include wired or wireless communication components or equipment (e.g., one or more transceivers, commiunication ports, antennas) that enable to electronic device 52 to communicate with one or more other devices. In other exemplary embodiments, the electronic device 52 may include a power source (e.g., battery, fuel cell, solar cell) or power connection (e.g., AC adapter, wall outlet connection, universal serial bus (USB) connection).

Figure 18:
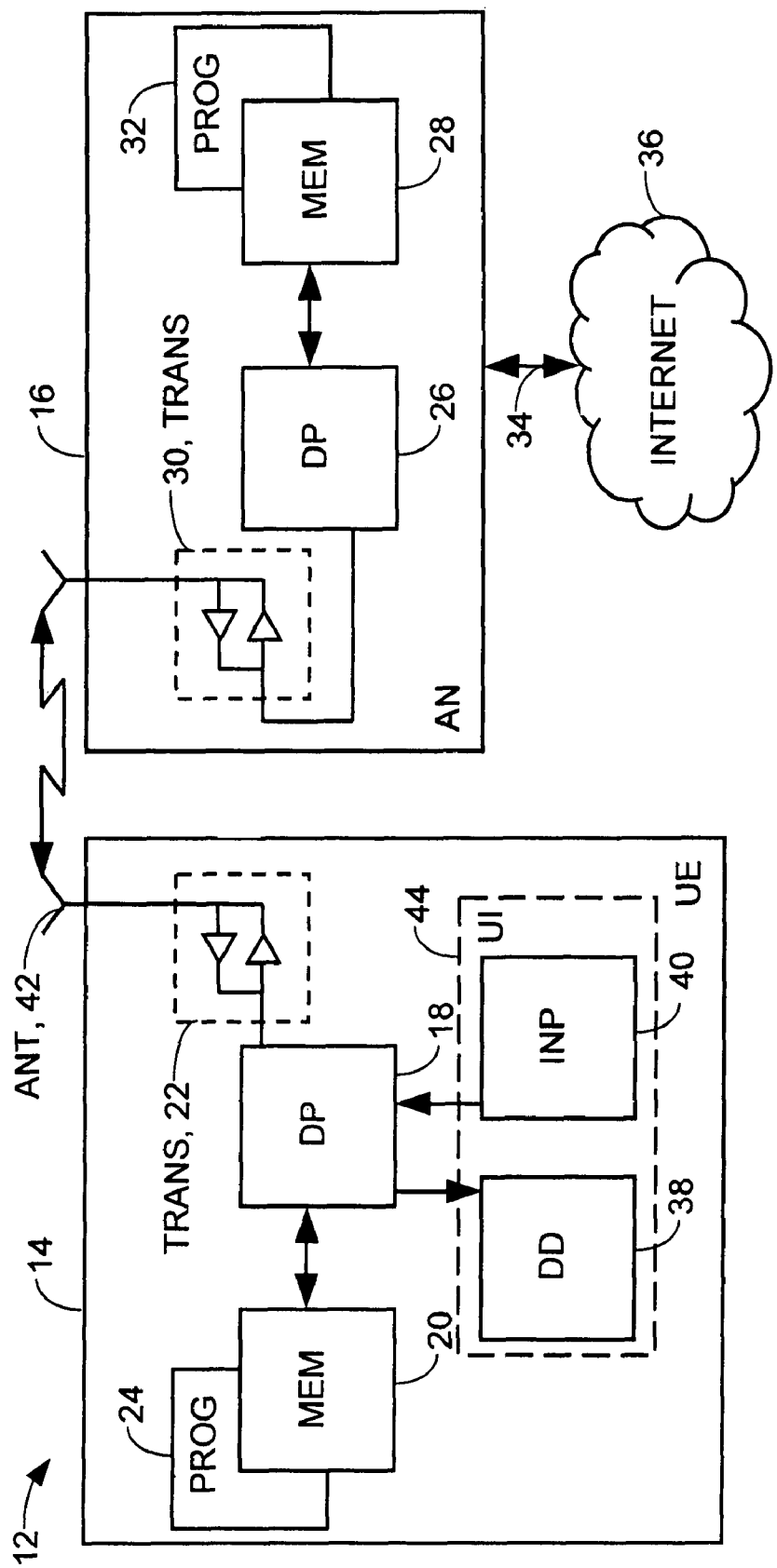
FIG. 18 illustrates a simplified block diagram of another electronic device that is suitable for use in practicing the exemplary embodiments of this invention.

Reference is made to FIG. 18 for illustrating a simplified block diagram of other electronic devices that are suitable for use in practicing the exemplary embodiments of this invention. In FIG. 18, a wireless network 12 is adapted for communication with a user equipment (UE) 14 via an access node (AN) 16. The UE 14 includes a data processor (DP) 18, a memory (MEM) 20 coupled to the DP 18, a suitable RF transceiver (TRANS) 22 (having a transmitter (TX) and a receiver (RX)) coupled to the DP 18, an antenna (ANT) 42 coupled to the TRANS 22 and a user interface (UI) 44 coupled to the DP 18. The MEM 20 stores a program (PROG) 24. The TRANS 22 and ANT 42 are for bidirectional wireless communications with the AN 16. The UI 44 includes a display device (DD) 38 and an input device (INP) 40. The DD 38 is configured to display information (e.g., graphics, text or combinations thereof, as non-limiting examples) to a user. The INP 40 is configured to receive an input from a user.

The AN 16 includes a data processor (DP) 26, a memory (MEM) 28 coupled to the DP 26, and a suitable RF transceiver (TRANS) 30 (having a transmitter (TX) and a receiver (RX)) coupled to the DP 26. The MEM 28 stores a program (PROG) 32. The TRANS 30 is for bidirectional wireless communications with the UE 14. Note that the TRANS 30 has at least one antenna to facilitate communication. The AN 16 is coupled via a data path 34 to one or more external networks or systems, such as the internet 36, for example.

The PROG 24 is assumed to include program instructions that, when executed by the DP 18, enable the UE 14 to operate in accordance with the exemplary embodiments of this invention, as discussed herein.

In general, the various exemplary embodiments of the UE 14 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable the DP 18 of the UE 14, or by hardware, or by a combination of software and hardware.

The MEMs 20, 28 may be of any type suitable to the local technical environment and may be implemented using any suitable data storage technology, such as semiconductor-based memory devices, magnetic memory devices and systems, optical memory devices and systems, fixed memory and removable memory, as non-limiting examples. The DPs 18, 26 may be of any type suitable to the local technical environment, and may include one or more of general purpose computers, special purpose computers, microprocessors, digital signal processors (DSPs) and processors based on a multi-core processor architecture, as non-limiting examples.

The DD 38 may be of any type suitable to the local technical environment, and may include one or more cathode ray tube (CRT) displays, liquid crystal displays (LCDs), plasma displays (e.g., plasma display panels, PDPs), digital light processing (DLP) projectors or displays, light-emitting diode (LED) displays, organic light-emitting diode (OLED) displays, liquid crystal on silicon (LCOS) displays, surface-conduction electron-emitter displays (SEDs), field emission displays (FEDs), interferometric modulator displays (IMODs), virtual retinal displays (VRDs), electroluminescent displays (ELDs), laser displays, carbon nanotube (CNT) displays and nanocrystal displays, as non-limiting examples.

The INP 40 may be of any type suitable to the local technical environment, and may include one or more keys, dials, buttons, keyboards, keypads (e.g., alphanumeric keypad), touchpads, touch screens, touch sensors, joysticks, gamepads, analog sticks, mouse, trackballs, accelerometers, tilt sensors, other sensors designed to sense movement of or in relation to the device, microphones, sound input devices, video cameras, cameras or optical recognition devices, as non-limiting examples.

The wireless network 12 may comprise a code division multiple access (CDMA) network, code division multiple access 2000 (CDMA2000) network, wideband code division multiple access (WCDMA) network, wireless local area network (WLAN), wide area network (WAN), orthogonal frequency division multiple access (OFDMA) network, general packet radio services (GPRS) network, global system for mobile communications (GSM) network, universal mobile telecommunications system (UMTS) network, UMTS terrestrial radio access network (UTRAN), enhanced data rates for GSM evolution (EDGE) network or evolved UMTS terrestrial radio access network (E-UTRAN), as non-limiting examples.

Figure 19:
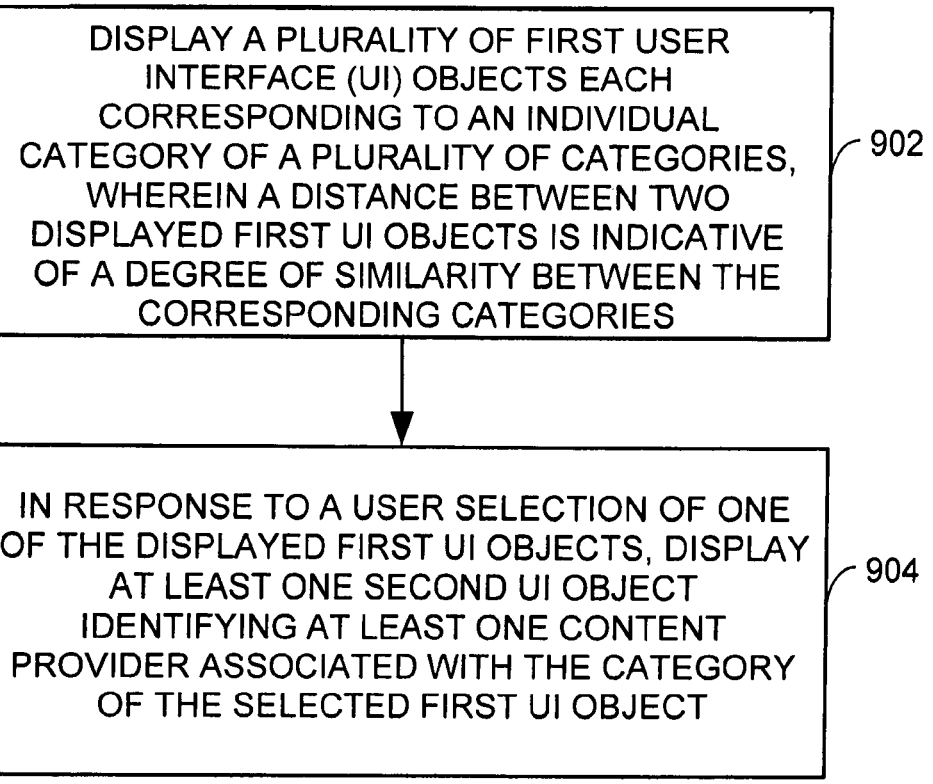
FIG. 19 depicts a flowchart illustrating one non-limiting example of a method for practicing the exemplary embodiments of this invention.

In one non-limiting, exemplary embodiment, and as shown in FIG. 19, a method comprises: displaying a plurality of first user interface (UI) objects each corresponding to an individual category of a plurality of categories, wherein a distance between two displayed first UI objects is indicative of a degree of similarity between the corresponding categories (box 902); and in response to a user selection of one of the displayed first UI objects, displaying at least one second UI object identifying at least one content provider associated with the category of the selected first UI object (box 904).

A method as described above, wherein the distance is based on data indicative of a shared audience between the corresponding categories. A method as in any method previously described, wherein the distance comprises a first distance, the at least one second UI object comprises a plurality of second UI objects, and a second distance between two displayed second UI objects is indicative of a degree of similarity between the corresponding content providers. A method as in any method previously described, wherein the first distance is based on data indicative of a shared audience between the corresponding categories and the second distance is based on data indicative of a shared audience between the corresponding content providers. A method as in any method previously described, the method further comprising while displaying the at least one second UI object, in response to a user input, displaying the plurality of first UI objects. A method as in any method previously described, the method further comprising modifying, by a user, at least one of the displayed first UI objects or at least one of the displayed second UI objects.

A method as in any method previously described, the method further comprising displaying at least one UI directional object indicating a direction in which a user can navigate. A method as in any method previously described, wherein each UI directional object of the at least one UI directional object is only displayed if there exists in the corresponding direction a first UI object or a second UI object to which the user can navigate. A method as in any method previously described, wherein each UI directional object of the at least one UI directional object corresponds to a first UI object or a second UI object to which the user can navigate. A method as in any method previously described, wherein a displayed UI directional object and the corresponding first UI object or second UI object both comprise a similar emphasis. A method as in any method previously described, wherein the at least one UI directional object comprises at least four directional objects, one each corresponding to a direction of up, down, left and right, each displayed first UI object or each displayed second UI object indicates one of six states, and the six states comprise a selected object, a non-selected object, an up object corresponding to the up UI directional object, a down object corresponding to the down UI directional object, a left object corresponding to the left UI directional object and a right object corresponding to the right UI directional object.

A method as in any method previously described, the method further comprising while displaying the plurality of first UI objects, displaying at least one first textual UI object identifying a category of the plurality of categories; and while displaying the at least one second UI object, displaying at least one second textual UI object identifying a content provider of the at least one content provider. A method as in any method previously described, wherein a currently-selected first UI object is located at a center of the displayed plurality of first UI objects and a currently-selected second UI object is located at a center of the displayed at least one second UI object. A method as in any method previously described, wherein the plurality of categories comprises a plurality of musical genres and the at least one content provider comprises at least one radio station.

In another non-limiting, exemplary embodiment, a computer program product comprising program instructions embodied on a tangible computer-readable medium, execution of the program instructions resulting in operations comprising: displaying a plurality of first user interface (UI) objects each corresponding to an individual category of a plurality of categories, wherein a distance between two displayed first UI objects is indicative of a degree of similarity between the corresponding categories; and in response to a user selection of one of the displayed first UI objects, displaying at least one second UI object identifying at least one content provider associated with the category of the selected first UI object.

A computer program product as described above, wherein the distance is based on data indicative of a shared audience between the corresponding categories. A computer program product as in any previous, wherein the distance comprises a first distance, wherein the at least one second UI object comprises a plurality of second UI objects, wherein a second distance between two displayed second UI objects is indicative of a degree of similarity between the corresponding content providers. A computer program product as in any previous, execution of the program instructions resulting in operations further comprising: displaying at least one UI directional object indicating a direction in which a user can navigate. A computer program product as in any previous, wherein each UI directional object of the at least one UI directional object corresponds to a first UI object or a second UI object to which the user can navigate. A computer program product as in any previous, wherein a displayed UI directional object and the corresponding first UI object or second UI object both comprise a similar emphasis. A computer program product as in any previous, wherein the similar emphasis comprises a same or similar color. A computer program product as in any previous, wherein the plurality of categories comprises a plurality of musical genres and the at least one content provider comprises at least one radio station.

In another non-limiting, exemplary embodiment, an electronic device comprising: a display device configured to display a plurality of first user interface (UI) objects each corresponding to an individual category of a plurality of categories, wherein a distance between two displayed first UI objects is indicative of a degree of similarity between the corresponding categories; and a user input, wherein in response to a user utilizing the user input to select one of the displayed first UI objects, the display device is configured to display at least one second UI object identifying at least one content provider associated with the category of the selected first UI object.

An electronic device as previously described, wherein the user input comprises a first user input, the electronic device further comprising: a second user input, wherein while the display device is displaying the at least one second UI object, in response to a user utilizing the second user input, the display device is configured to display the plurality of first UI objects. An electronic device as in any previous, wherein the user input comprises a first user input, the electronic device further comprising: a second user input configured, in response to a user utilizing the second user input, to modify at least one of the displayed first UI objects or at least one of the displayed at least one second UI object. An electronic device as in any previous, wherein the display device is further configured to display at least one UI directional object indicating a direction in which a user can navigate. An electronic device as in any previous, wherein each UI directional object of the at least one UI directional object corresponds to a first UI object or a second UI object to which the user can navigate, wherein a displayed UI directional object and the corresponding first UI object or second UI object both comprise a same or similar color. An electronic device as in any previous, wherein the plurality of categories comprises a plurality of musical genres and the at least one content provider comprises at least one radio station. An electronic device as in any previous, further comprising a transceiver configured to communicate with another electronic device; and an antenna. An electronic device as in any previous, wherein the user input comprises at least one of a touchpad, a touch screen and a key of a keypad. An electronic device as in any previous, wherein the electronic device comprises a mobile electronic device. An electronic device as in any previous, wherein the mobile electronic device comprises a mobile phone.

In another non-limiting, exemplary embodiment, an electronic device comprising: display means for displaying a plurality of first user interface (UI) objects each corresponding to an individual category of a plurality of categories, wherein a distance between two displayed first UI objects is indicative of a degree of similarity between the corresponding categories; and user input means for receiving a user input, wherein in response to a user utilizing the user input means to select one of the displayed first UI objects, the display means is further configured for displaying at least one second UI object identifying at least one content provider associated with the category of the selected first UI object.

An electronic device as previously described, wherein the display means comprises a display device and the user input means comprises a user input device. An electronic device as in any previously described electronic device.

The exemplary embodiments of the invention, as discussed above and as particularly described with respect to exemplary methods, may be implemented as a computer program product comprising program instructions embodied on a tangible computer-readable medium. Execution of the program instructions results in operations comprising steps of utilizing the exemplary embodiments or steps of the method.

The various exemplary embodiments, exemplary aspects and exemplary elements thereof may be combined in any manner practicable (e.g., in one or more multiple dependent claims) to obtain an exemplary embodiment incorporating multiple exemplary aspects and/or exemplary elements.

As can be appreciated, the exemplary embodiments of the invention provide various advantages over a list-based representation of content providers (e.g., a list of radio stations). In accordance with aspects of the exemplary embodiments, a user can see the relationships between categories and/or content providers in an intuitive manner. Furthermore, a user is presented with the most relevant content without having to scroll through a long list of unrelated or irrelevant information.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Exemplary embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred exemplary embodiments of this invention could be used to advantage without the corresponding use of other features. As such, the foregoing description should be considered as merely illustrative of the principles of the invention, and not in limitation thereof.

What is claimed is:

1. A method comprising:
    displaying on a display device a first user interface (UI) view comprising a plurality of first UI objects each corresponding to an individual category of a plurality of categories, wherein a distance between two displayed first UI objects is indicative of a degree of similarity between the corresponding categories; and
    in response to a user selection of one of the displayed first UI objects, displaying on the display device a second UI view instead of the first UI view, wherein the second UI view comprises at least two second UI objects identifying at least two content providers associated with the category of the selected first UI object, wherein the plurality of categories comprises a plurality of musical genres and the at least two content providers comprise at least one radio station, wherein the first UI view comprises a genre map and the second UI view comprises a station map.

2. The method of claim 1, wherein the distance is based on data indicative of a shared audience between the corresponding categories.

3. The method of claim 1, wherein the distance comprises a first distance, wherein a second distance between two displayed second UI objects is indicative of a degree of similarity between the corresponding content providers.

4. The method of claim 3, wherein the first distance is based on data indicative of a shared audience between the corresponding categories and wherein the second distance is based on data indicative of a shared audience between the corresponding content providers.

5. The method of claim 1, further comprising:
    while displaying the second UI view, in response to a user input, displaying the first UI view instead of the second UI view.

6. The method of claim 5, wherein displaying the first UI view instead of the second UI view comprises zooming out to the first UI view.

7. The method of claim 1, further comprising:
    modifying, by a user, at least one of the displayed first UI objects or at least one of the displayed at least two second UI objects.

8. The method of claim 1, further comprising:
    displaying at least one UI directional object indicating a direction in which a user can navigate.

9. The method of claim 8, wherein each UI directional object of the at least one UI directional object corresponds to a first UI object or a second UI object to which the user can navigate.

10. The method of claim 9, wherein a displayed UI directional object and the corresponding first UI object or second UI object both comprise a similar emphasis.

11. The method of claim 10, wherein the similar emphasis comprises a same color or a similar color.

12. The method of claim 10, wherein the at least one UI directional object comprises at least four directional objects, one each corresponding to a direction of up, down, left and right, wherein each displayed first UI object or each displayed second UI object indicates one of six states, wherein the six states comprise a selected object, a non-selected object, an up object corresponding to the up UI directional object, a down object corresponding to the down UI directional object, a left object corresponding to the left UI directional object and a right object corresponding to the right UI directional object.

13. The method of claim 8, wherein each UI directional object of the at least one UI directional object is only displayed if there exists in the corresponding direction a first UI object or a second UI object to which the user can navigate.

14. The method of claim 1, further comprising:
    while displaying the plurality of first UI objects, displaying at least one first textual UI object identifying a category of the plurality of categories; and
    while displaying the at least two second UI objects, displaying at least one second textual UI object identifying a content provider of the at least two content providers.

15. The method of claim 1, where the user selection comprises a first user selection, the method further comprising:
    in response to a second user selection of one of the displayed second UI objects, obtaining content from the corresponding selected content provider.

16. The method of claim 1, wherein displaying the second UI view instead of the first UI view comprises zooming in on the selected first UI object.

17. The method of claim 1, wherein the second UI view does not comprise the plurality of first UI objects.

18. The method of claim 1, further comprising: while displaying the at least two second UI objects, in response to a user selecting a displayed second UI object, retrieving content from the content provider associated with the selected second UI object.

19. The method of claim 1, wherein a currently-selected first UI object is located at a center of the displayed first UI view and wherein a currently-selected second UI object is located at a center of the displayed second UI view.

20. A tangible computer-readable storage medium storing program instructions, execution of the program instructions resulting in operations comprising:
 displaying a first user interface (UI) view comprising a plurality of first UI objects each corresponding to an individual category of a plurality of categories, wherein a distance between two displayed first UI objects is indicative of a degree of similarity between the corresponding categories; and
 in response to a user selection of one of the displayed first UI objects, displaying a second UI view instead of the first UI view, wherein the second UI view comprises at least two second UI objects identifying at least two content providers associated with the category of the selected first UI object, wherein the plurality of categories comprises a plurality of musical genres and the at least two content providers comprise at least one radio station, wherein the first UI view comprises a genre map and the second UI view comprises a station map.

21. The computer-readable storage medium of claim 20, wherein the distance is based on data indicative of a shared audience between the corresponding categories.

22. The computer-readable storage medium of claim 20, wherein the distance comprises a first distance, wherein a second distance between two displayed second UI objects is indicative of a degree of similarity between the corresponding content providers.

23. The computer-readable storage medium of claim 20, execution of the program instructions resulting in operations further comprising:
 displaying at least one UI directional object indicating a direction in which a user can navigate.

24. The computer-readable storage medium of claim 23, wherein each UI directional object of the at least one UI directional object corresponds to a first UI object or a second UI object to which the user can navigate.

25. The computer-readable storage medium of claim 24, wherein a displayed UI directional object and the corresponding first UI object or second UI object both comprise a similar emphasis.

26. An apparatus comprising:
 a processor; and
 a memory including computer program instructions, the memory and the computer program instructions being configured to, with the processor, cause the apparatus at least to perform:
 displaying a first user interface (UI) view comprising a plurality of first UI objects each corresponding to an individual category of a plurality of categories, wherein a distance between two displayed first UI objects is indicative of a degree of similarity between the corresponding categories; and
 in response to a user selection of one of the displayed first UI objects, displaying a second UI view instead of the first UI view, wherein the second UI view comprises at least two second UI objects identifying at least two content providers associated with the category of the selected first UI object, wherein the plurality of categories comprises a plurality of musical genres and the at least two content providers comprise at least one radio station, wherein the first UI view comprises a genre map and the second UI view comprises a station map.

27. The apparatus of claim 26, the memory and the computer program instructions being configured to, with the processor, cause the apparatus at least to further perform:
 while displaying the second UI view, in response to a second user input, displaying the first UI view instead of the second UI view.

28. The apparatus of claim 26, the memory and the computer program instructions being configured to, with the processor, cause the apparatus at least to further perform:
 modifying at least one of the displayed first UI objects or at least one of the displayed at least two second UI object.

29. The apparatus of claim 26, the memory and the computer program instructions being configured to, with the processor, cause the apparatus at least to further perform: displaying at least one UI directional object indicating a direction in which a user can navigate, wherein each UI directional object of the at least one UI directional object corresponds to a first UI object or a second UI object to which the user can navigate, wherein a displayed UI directional object and the corresponding first UI object or second UI object both comprise a same or similar color.

30. The apparatus of claim 26, further comprising:
 a transceiver configured to communicate with another apparatus; and
 an antenna.

31. The apparatus of claim 26, wherein the apparatus comprises a mobile electronic device.

32. The apparatus of claim 26, wherein the apparatus comprises a mobile phone.

33. An apparatus comprising:
 display means for displaying a first user interface (UI) view comprising a plurality of first UI objects each corresponding to an individual category of a plurality of categories, wherein a distance between two displayed first UI objects is indicative of a degree of similarity between the corresponding categories; and
 user input means for receiving a user input, wherein in response to a user utilizing the user input means to select one of the displayed first UI objects, the display means is further for displaying a second UI view instead of the first UI view, wherein the second UI view comprises at least two second UI objects identifying at least two content providers associated with the category of the selected first UI object, wherein the plurality of categories comprises a plurality of musical genres and the at least two content providers comprise at least one radio station, wherein the first UI view comprises a genre map and the second UI view comprises a station map.

34. The apparatus of claim 33, wherein the display means comprises a display device and the user input means comprises a user input device.

* * * * *